United States Patent
Kridlo

(10) Patent No.: US 9,215,266 B2
(45) Date of Patent: *Dec. 15, 2015

(54) SYSTEM AND METHOD FOR ZERO-FOOTPRINT SCREEN CAPTURE

(75) Inventor: Michal Kridlo, Kolin (CZ)

(73) Assignee: ZOOM INTERNATIONAL S.R.O., Prague (CZ)

( * ) Notice: Subject to any disclaimer, the term of this patent is extended or adjusted under 35 U.S.C. 154(b) by 266 days.

This patent is subject to a terminal disclaimer.

(21) Appl. No.: 13/359,484

(22) Filed: Jan. 26, 2012

(65) Prior Publication Data

US 2013/0198336 A1    Aug. 1, 2013

(51) Int. Cl.
    *G06F 15/16*    (2006.01)
    *H04L 29/08*    (2006.01)
    *G06F 9/44*     (2006.01)
    *G06F 3/14*     (2006.01)

(52) U.S. Cl.
    CPC .............. *H04L 67/06* (2013.01); *G06F 3/1454* (2013.01); *G06F 9/4446* (2013.01); *H04L 67/36* (2013.01)

(58) Field of Classification Search
    CPC ............................. G06F 3/1454; G06F 9/4446
    USPC ....................................................... 709/219
    See application file for complete search history.

(56) References Cited

U.S. PATENT DOCUMENTS

| | | | |
|---|---|---|---|
| 6,058,163 A * | 5/2000 | Pattison et al. | 379/265.06 |
| 6,741,586 B1 * | 5/2004 | Schuster et al. | 370/352 |
| 7,197,535 B2 | 3/2007 | Salesky | |
| 7,728,870 B2 * | 6/2010 | Rudnik et al. | 348/143 |
| 7,933,955 B2 * | 4/2011 | Khalatian | 709/205 |
| 8,224,970 B2 * | 7/2012 | Nishiyama | 709/227 |
| 2002/0080171 A1 * | 6/2002 | Laferriere et al. | 345/751 |
| 2003/0085923 A1 * | 5/2003 | Chen et al. | 345/751 |
| 2004/0075619 A1 * | 4/2004 | Hansen | 345/1.1 |
| 2004/0222995 A1 * | 11/2004 | Colle | 345/545 |
| 2006/0002315 A1 * | 1/2006 | Theurer et al. | 370/261 |
| 2007/0297577 A1 * | 12/2007 | Wyss | 379/67.1 |
| 2008/0055191 A1 * | 3/2008 | Craig et al. | 345/2.2 |
| 2008/0215722 A1 * | 9/2008 | Hogaboom et al. | 709/224 |
| 2008/0282178 A1 * | 11/2008 | Jones et al. | 715/765 |
| 2008/0301282 A1 * | 12/2008 | Coleman | 709/224 |
| 2009/0183200 A1 * | 7/2009 | Gritton et al. | 725/37 |
| 2009/0217177 A1 * | 8/2009 | DeGrazia | 715/753 |
| 2010/0070842 A1 * | 3/2010 | Aymeloglu et al. | 715/207 |
| 2010/0088683 A1 * | 4/2010 | Golender et al. | 717/128 |
| 2010/0091320 A1 * | 4/2010 | Sojian | 358/1.15 |
| 2010/0115417 A1 * | 5/2010 | Cox et al. | 715/740 |

(Continued)

*Primary Examiner* — Blake Rubin
(74) *Attorney, Agent, or Firm* — Galvin Patent Law LLC; Brian R. Galvin

(57) ABSTRACT

A system for zero-footprint screen capture, comprising a communication server software module, a screen capture server software module, a web server software module, and a media upload server software module, wherein the web server, on receiving a request for a specific web page from a client application whose screen is to be captured, uploads a persistent screen capture software application to the client, and further wherein, upon receiving a connection request from the screen capture application, establishes a persistent connection to the screen capture application and, on receiving a notification from the communication server pertaining to an interaction involving a user of the client application, sends instructions via the persistent connection to the screen capture application, and wherein the media upload server receives via the established connection to the uploaded screen capture application one or more data packets containing screen capture graphics data.

11 Claims, 12 Drawing Sheets

(56) References Cited

U.S. PATENT DOCUMENTS

| | | | |
|---|---|---|---|
| 2010/0299180 A1* | 11/2010 | Tsatalos et al. | 705/9 |
| 2011/0126130 A1* | 5/2011 | Lieb et al. | 715/753 |
| 2011/0138314 A1* | 6/2011 | Mir et al. | 715/779 |
| 2011/0213860 A1* | 9/2011 | Ezerzer et al. | 709/218 |
| 2012/0226742 A1* | 9/2012 | Momchilov et al. | 709/203 |
| 2012/0254381 A1* | 10/2012 | Rodrigues | 709/221 |
| 2012/0303629 A1* | 11/2012 | Klein et al. | 707/741 |
| 2013/0258042 A1* | 10/2013 | Shun et al. | 348/14.08 |

\* cited by examiner

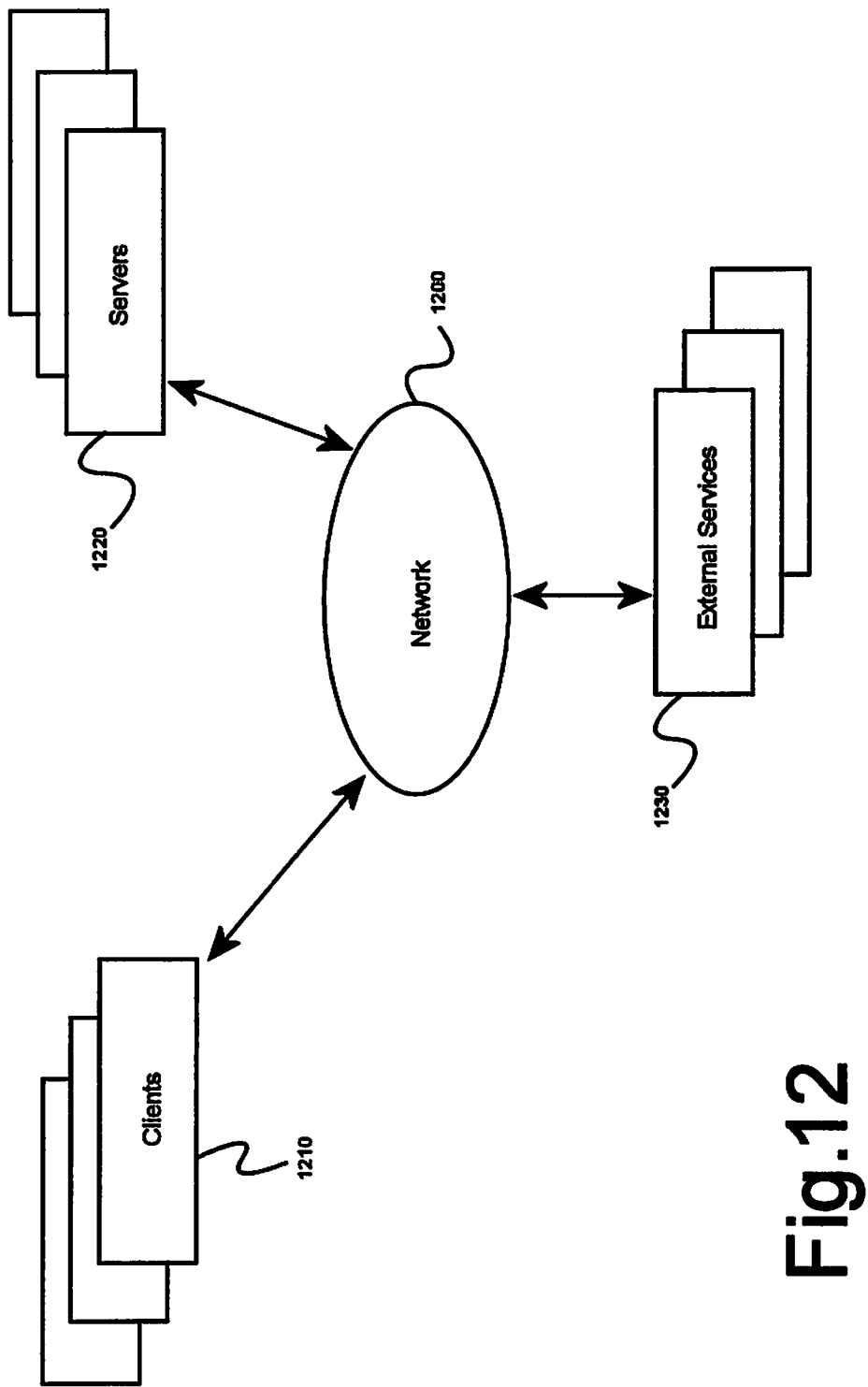

SYSTEM AND METHOD FOR ZERO-FOOTPRINT SCREEN CAPTURE

CROSS-REFERENCE TO RELATED APPLICATIONS

None.

BACKGROUND OF THE INVENTION

1. Field of the Invention

The invention relates to the field of contact center software, and more particularly to the field of monitoring or recording contact center agent performance using screen capture of an agent's actions taken on a computer while handling customer interactions.

2. Discussion of the State of the Art

An important aspect to be considered in managing any contact center (or call center, which is a contact center handling only phone calls) is to take steps to ensure that the quality of interactions with customers is as good as can reasonably be achieved. The measurement of quality, especially when considered as the measurement of quality as perceived by a customer, is a challenge of great difficulty. In order to facilitate both measurement of service quality and to monitor performance of customer service representatives (typically referred to as "agents", which term will be used herein), it has become commonplace for some or all calls to be recorded in order that the calls can be listened to, at later more convenient times and using various sampling techniques, by professionals referred to as "quality monitors". Virtually all contact centers of any size have a full-time staff of quality monitors.

In addition to listening to the audio content of a call, it is advantageous to also be able to see what an agent was doing during the call as well. For example, by seeing what an agent was typing as a caller recounted a particular problem which required service to resolve, a quality monitor might be able to identify a training issue (as when an agent is found to be so focused on typing word for word what a customer is saying that the agent misses the point the customer was trying to make, or when an agent incorrectly classifies a call and thereafter sends it to an incorrectly chosen specialist). Because of the obvious utility of capturing both audio and screen capture records of what transpired during a service incident (or call), the use of screen capture technologies has become a mainstream element of modern contact centers.

Unfortunately, systems that capture screens of agent desktops during calls tend to be quite expensive, require dedicated technical staff to maintain, and generally store their screen capture data locally (along with audio call recordings). These facts mean that screen capture is often not carried out by smaller contact centers, which do not have the budgets or the technical staff needed to implement, maintain, and use such systems. Additionally, many larger contact center operators have found it difficult to maintain separate call monitoring databases at each contact center site, and have moved toward centralized administration and storage of call monitoring records (by which is meant audio and screen capture recordings). However, even for large organizations, maintaining centralized call recording systems has proven challenging and expensive. In addition, for large corporations, the cost and technical challenges of keeping large amounts of agent desktops up to date (since each of them generally has had to have a dedicated screen capture application running on it, which communicates with the centralized recording storage systems) have proven to be significant. And finally, as contact center outsourcing (which primarily means outsourcing the work of contact center agents) has expanded worldwide, a problem has emerged because it is difficult for a large enterprise to keep multiple outsourcers up to date with their screen capture solutions—and for outsourcers the problem is even worse, as they typically have to build integrations and stay current with multiple clients' different approaches to call and screen recording.

At the same time as these problems have become pressing in traditional, premise-based contact center systems (that is, systems where the hardware and software used reside on the premise of the contact center or in a nearby data center operated by the same company), cloud computing has emerged as a major new paradigm in business (and consumer) computing. In cloud computing, physical resources are located away from users, accessible via the Internet to users from many enterprises. Deploying software "in the cloud" holds great promise for enterprises, as it promises to provide ready to access to the latest, highly-tested versions of each application without the enterprise having to manage the software maintenance process.

From the perspective of call and screen recording, cloud-based computing is perhaps even more promising. A single cloud-based vendor can easily build, integrate, and maintain a solid, well-tested platform for call recording and screen capture, and can then make it accessible to many clients (enterprises) with minimal setup times. Moreover, cloud-based solutions are typically paid for as they are used, so what was once a significant capital expense that was hard to size (enterprises often tend to buy more than they need for normal operations, since they plan for peak period usage) has become a highly-variable operating expense (surging for peak periods is usually quite simple, and the extra capacity is only paid for when used).

Given the challenges in screen capture solutions, that have limited their use in small contact centers, in large, multisite operations, and in or in conjunction with outsourcers, a shift to cloud-based solutions offers very compelling advantages. However, existing efforts to deploy screen capture from the cloud have generally involved installation of a specialized software application on the desktops whose screens are to be recorded, with the result that adoption of cloud-based screen capture solutions has been limited to specialty applications to date, and has not been adopted much in the contact center world.

What is needed is a cloud-based screen capture solution suitable for use in call centers both large and small, and with or without outsourcing, that does not require any permanent software installation on agent desktops.

SUMMARY OF THE INVENTION

In order to address the problems in the art described above, in a preferred embdodiment the inventor has conceived and reduced to practice a system for zero-footprint screen capture, comprising a communication server software module operating on a network-connected computer, a screen capture server software module operating on a network-connected computer, a web server software module operating on a network-connected computer, and a media upload server software module operating on a network-connected computer. According to the embodiment, the web server, on receiving a request for a specific web page from a client application whose screen is to be eligible to be captured, uploads a persistent screen capture software application to the client; and upon receiving a connection request from the screen capture application uploaded to the client, the screen capture server establishes a persistent connection to the uploaded screen capture application; and the screen capture server, on receiving a notification from the communication server pertaining to an interaction involving a user of the client application, sends instructions via the persistent connection to the uploaded screen capture application. Further, the media upload server, on receiving a connection request from the uploaded screen capture application, establishes a connection to the uploaded screen capture application, and receives via the established connection to the uploaded screen capture application one or more data packets containing screen capture graphics data.

According to another embodiment of the invention, the data packets containing screen capture graphics data are stored in a media storage database connected to the media upload server. According to yet another embodiment of the invention, the data packets containing screen capture graphics data are transmitted by the media upload server to a monitoring station for viewing by a monitoring user. In a further embodiment, the user of the client application eligible for screen capture is an agent of a contact center. In another embodiment, the data packets are formatted using a protocol that allows at least variable screen capture graphics data compression based on available upload bandwidth. In some embodiments, a plurality of media upload servers are used, and the screen capture server, when sending instructions to the screen capture application to commence a screen capture operation, includes in the instructions an identity or a location of a particular media upload server to connect to for the screen capture operation being commenced.

In another preferred embodiment of the invention, a method for zero-footprint screen capture is disclosed, The method comprising the steps of: (a) establishing a connection from a client desktop of a contact center agent to a web server; (b) uploading and installing a screen capture application from the web server to the client desktop of the contact center agent, if a screen capture application is not already installed on the client desktop; (c) establishing a connection from the uploaded screen capture application to a screen capture server; (d) receiving a notification from a communication server at the screen capture server pertaining to an interaction involving the contact center agent; (e) based at least on notification received, sending instructions from the screen capture server to the uploaded screen capture application instructing it to commence screen capture operations; (f) based on the instructions received by the uploaded screen capture application, obtaining screen capture screen graphics data; and (g) sending the screen capture graphics data in a plurality of data packets to a media upload server.

In another embodiment of the invention, the method further comprises the step of storing the screen capture graphics data received by the media upload server in a media storage database. In another embodiment of the invention, the method further comprises the step of transmitting the data packets containing screen capture graphics data by the media upload server to a monitoring station for viewing by a monitoring user. In another embodiment of the invention, the data packets are formatted using a protocol that allows at least variable screen capture graphics data compression based on available upload bandwidth.

BRIEF DESCRIPTION OF THE DRAWING FIGURES

Various embodiments of the invention will now be described in detail by way of example only with reference to the following drawings:

FIG. 12 is a block diagram showing an exemplary architectural arrangement of clients, servers, and external services, according to an embodiment of the invention.

DETAILED DESCRIPTION

Figure 1:
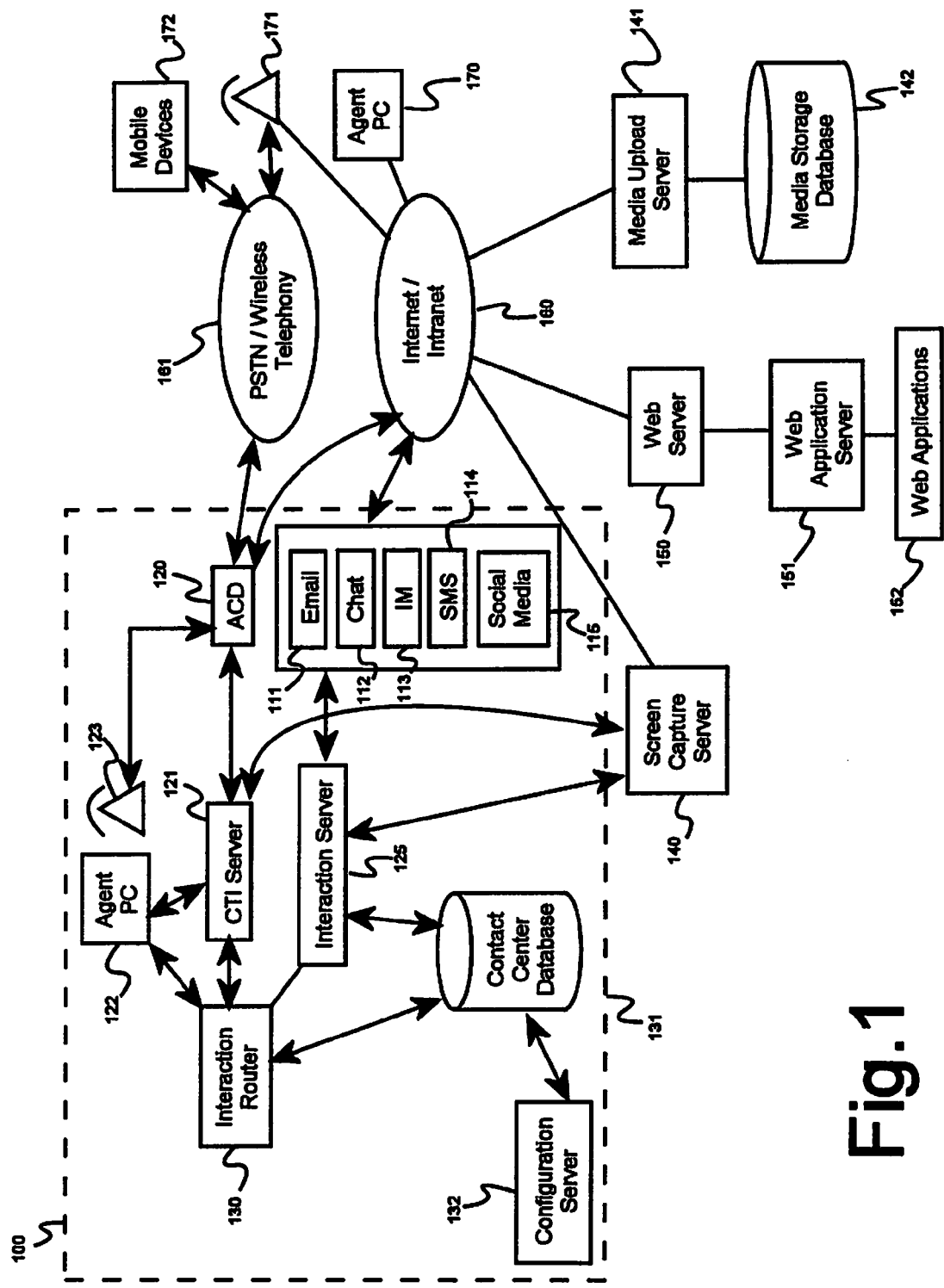
FIG. 1 is a block diagram of a preferred embodiment of the invention showing various components and their interrelationships.

The inventor has conceived, and reduced to practice, a system and method for recording screen activities of contact center agents that is suitable for cloud-based deployment, and that does not require the installation of screen capture software on agent desktops.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention (s).

Furthermore, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, or on a network interface card. In a specific embodiment, the techniques disclosed herein may be implemented in software such as an operating system or in an application running on an operating system.

Software/hardware hybrid implementation(s) of at least some of the embodiment(s) disclosed herein may be implemented on a programmable machine selectively activated or reconfigured by a computer program stored in memory. Such network devices may have multiple network interfaces that may be configured or designed to utilize different types of network communication protocols. A general architecture for some of these machines may appear from the descriptions disclosed herein. According to specific embodiments, at least some of the features and/or functionalities of the various embodiments disclosed herein may be implemented on one or more general-purpose network host machines such as an end-user computer system, computer, network server or server system, mobile computing device (e.g., personal digital assistant, mobile phone, smartphone, laptop, tablet computer, or the like), consumer electronic device, music player, or any other suitable electronic device, router, switch, or the like, or any combination thereof. In at least some embodiments, at least some of the features and/or functionalities of the various embodiments disclosed herein may be implemented in one or more virtualized computing environments (e.g., network computing clouds, or the like).

Figure 10:
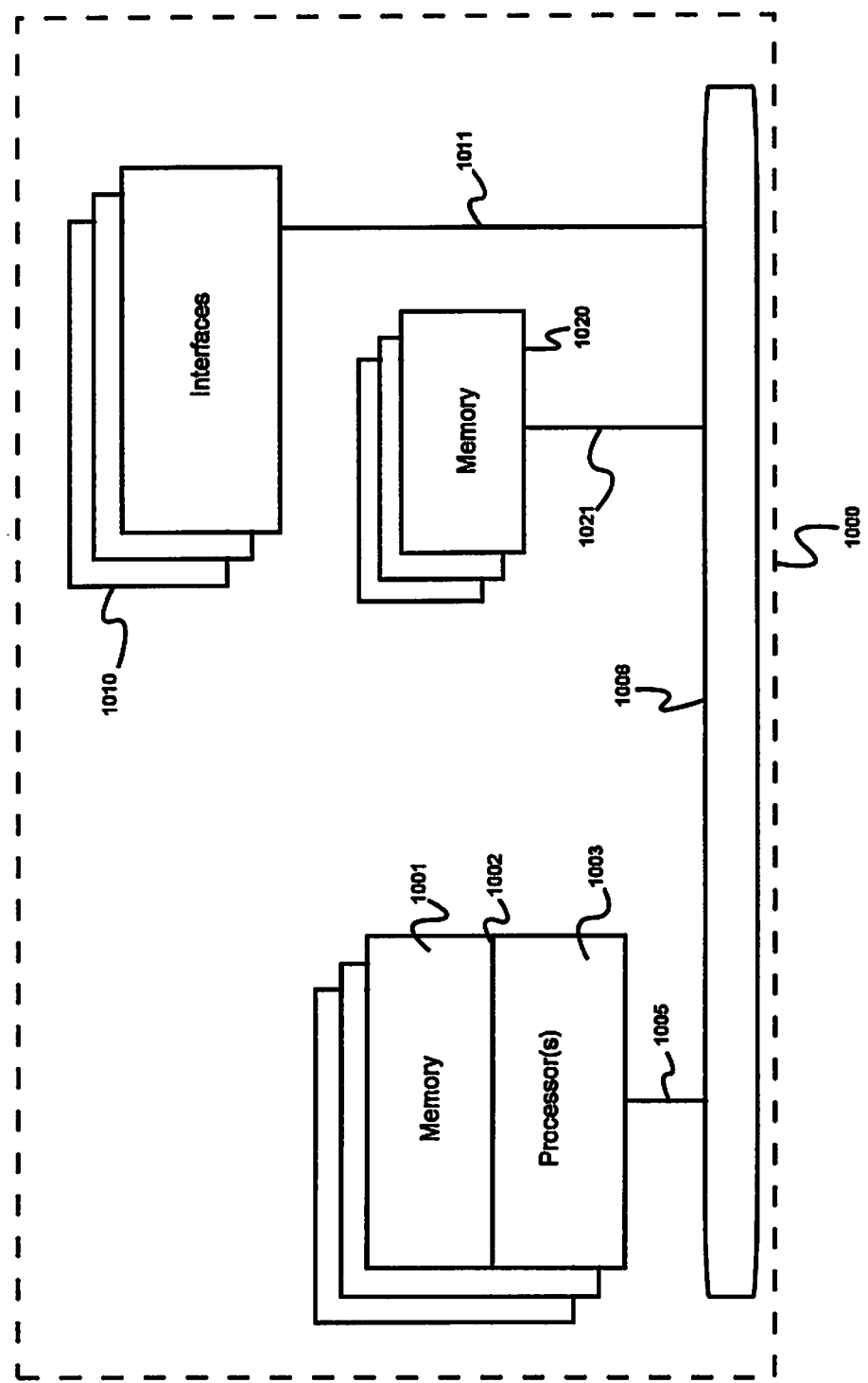
FIG. 10 is a block diagram illustrating an exemplary hardware architecture of a computing device used in an embodiment of the invention.

Referring now to FIG. 10, there is shown a block diagram depicting a computing device 1000 suitable for implementing at least a portion of the features and/or functionalities disclosed herein. Computing device 1000 may be, for example, an end-user computer system, network server or server system, mobile computing device (e.g., personal digital assistant, mobile phone, smartphone, laptop, tablet computer, or the like), consumer electronic device, music player, or any other suitable electronic device, or any combination or portion thereof. Computing device 1000 may be adapted to communicate with other computing devices, such as clients and/or servers, over a communications network such as the Internet, using known protocols for such communication, whether wireless or wired.

In one embodiment, computing device 1000 includes central processing unit (CPU) 1002, interfaces 1010, and a bus 1006 (such as a peripheral component interconnect (PCI) bus). When acting under the control of appropriate software or firmware, CPU 1002 may be responsible for implementing specific functions associated with the functions of a specifically configured computing device or machine. For example, in at least one embodiment, a user's [[[personal digital assistant (PDA) may be configured or designed to function as an intelligent automated assistant]]] system utilizing CPU 1002, memory 1001, 1020, and interface(s) 1010. In at least one embodiment, CPU 1002 may be caused to perform one or more of the different types of functions and/or operations under the control of software modules/components, which for example, may include an operating system and any appropriate applications software, drivers, and the like.

CPU 1002 may include one or more processor(s) 1003 such as, for example, a processor from one of the Intel, ARM, Qualcomm, and AMD families of microprocessors. In some embodiments, processor(s) 1003 may include specially designed hardware (e.g., application-specific integrated circuits (ASICs), electrically erasable programmable read-only memories (EEPROMs), field-programmable gate arrays (FPGAs), and the like) for controlling operations of computing device 1000. In a specific embodiment, a memory 1001 (such as non-volatile random access memory (RAM) and/or read-only memory (ROM)) also forms part of CPU 1002. However, there are many different ways in which memory may be coupled to the system. Memory block 1001 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 1010 are provided as interface cards (sometimes referred to as "line cards"). Generally, they control the sending and receiving of data packets over a computing network and sometimes support other peripherals used with computing device 1000. Among the interfaces that may be provided are Ethernet interfaces, frame relay interfaces, cable interfaces, DSL interfaces, token ring interfaces, and the like. In addition, various types of interfaces may be provided such as, for example, universal serial bus (USB), Serial, Ethernet, Firewire™, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 1010 may include ports appropriate for communication with appropriate media. In some cases, they may also include an independent processor and, in some in stances, volatile and/or non-volatile memory (e.g., RAM).

Although the system shown in FIG. 10 illustrates one specific architecture for a computing device 1000 for implementing the techniques of the invention(s) described herein, it is by no means the only device architecture on which at least a portion of the features and techniques described herein may be implemented. For example, architectures having one or any number of processors 1003 can be used, and such processors 1003 can be present in a single device or distributed among any number of devices. In one embodiment, a single processor 1003 handles communications as well as routing computations. In various embodiments, different types of features and/or functionalities may be implemented in a system according to the invention that includes a client device (such as a personal digital assistant or smartphone running client software) and server system(s) (such as a server system described in more detail below).

Regardless of network device configuration, the system of the present invention may employ one or more memories or memory modules (such as, for example, memory block 1020) configured to store data, program instructions for the general-purpose network operations and/or other information relating to the functionality of the embodiments described herein. The program instructions may control the operation of an operating system and/or one or more applications, for example. The memory or memories may also be configured to store data structures, domain and topic information, social network graph information, user actions information, and/or other specific non-program information described herein.

Because such information and program instructions may be employed to implement the systems/methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both machine code, such as produced by a compiler, and files containing higher level code that may be executed by the computer using an interpreter.

Figure 11:
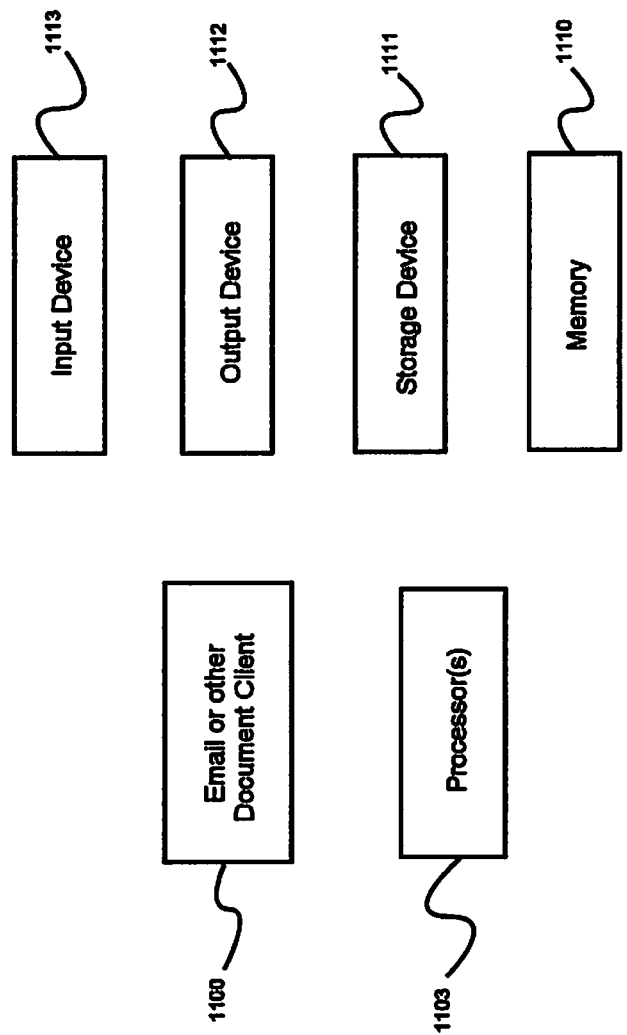
FIG. 11 is a block diagram illustrating an exemplary logical architecture for a client device, according to an embodiment of the invention.

In some embodiment, systems used according to the present invention may be implemented on a standalone computing system. Referring now to FIG. 11, there is shown a block diagram depicting an architecture for implementing one or more embodiments or components thereof on a standalone computing system. Computing device 1000 includes processor(s) 1003 that run software for implementing for example an email or other document management client application 1100. Input device 1112 can be of any type suitable for receiving user input, including for example a keyboard, touchscreen, microphone (for example, for voice input), mouse, touchpad, trackball, five-way switch, joy stick, and/or any combination thereof. Output device 1711 can be a screen, speaker, printer, and/or any combination thereof. Memory 1710 can be random-access memory having a structure and architecture as are known in the art, for use by processor(s) 1603 for example to run software. Storage device 1711 can be any magnetic, optical, and/or electrical storage device for storage of data in digital form; examples include flash memory, magnetic hard drive, CD-ROM, and/or the like.

In some embodiments, the system of the present invention is implemented on a distributed computing network, such as one having any number of clients and/or servers. Referring now to FIG. 12, there is shown a block diagram depicting an architecture for implementing at least a portion of an intelligent automated assistant on a distributed computing network, according to at least one embodiment.

The arrangement shown in FIG. 12, any number of clients 1210 are provided; each client 1210 may run software for implementing client-side portions of the present invention. In addition, any number of servers 1220 can be provided for handling requests received from clients 1210. Clients 1210 and servers 1220 can communicate with one another via electronic network 1200, which may be in various embodiments any of the Internet, a wide area network, a mobile telephony network, a wireless network (such as WiFi, Wimax, and so forth), or a local area network (or indeed any network topology known in the art; the invention does not prefer any one network topology over any others). Network 1200 may be implemented using any known network protocols, including for example wired and/or wireless protocols.

In addition, in some embodiment, servers 1220 can call external services 1230 when needed to obtain additional information, to refer to additional data concerning a particular document or message, or to access for example curated data sources (for example, Wolfram Alpha™) in order to assist in building rich ontologies. Communications with external services 1230 can take place, for example, via network 1200. In various embodiments, external services 1230 include web-enabled services and/or functionality related to or installed on the hardware device itself. For example, in an embodiment where email client 1100 is implemented on a smartphone or other electronic device, client 1100 can obtain information stored in an email archive or a document store in the cloud or on an external service 1230 deployed on one or more of a particular enterprise's or user's premises.

In various embodiments, functionality for implementing the techniques of the present invention can be distributed among any number of client and/or server components. For example, various software modules can be implemented for performing various functions in connection with the pre sent invention, and such modules can be variously implemented to run on server and/or client components.

DETAILED DESCRIPTION OF EMBODIMENTS

In a preferred embodiment, and referring to FIG. 1, contact center 100 is a client of a cloud-based screen capture solution according to the invention. As is typical of contact centers, center 100 receives inbound (or makes outbound) calls to (from) customers, who may be using mobile devices 172 or conventional telephones 171 to connect. Telephones 171 can use conventional time-division multiplexed (TDM) telephone (or plain old telephony services—POTS) to make connections via public switched telephone network (PSTN) 161, or they may use voice over Internet protocol (VOIP) telephony, both of which are well known in the art. PSTN 161 may also be a wireless mobile telephony network servicing consumers that use mobile devices 172, and call centers 100 (again, "call center", "contact center", and "center" may be used interchangeably throughout this document) typically accept calls from any telephones, whether landlines, Internet phones, or mobile phones (or even payphones, for example), although they are generally connected to only one or two PSTN networks 161, with customers using other networks reaching them through use of interconnect features built in to all telecommunications networks today. Also, centers 100 may typically receive or make calls over the Internet 160 directly when customers are using VOIP telephones or software-based communications means such as an instant messaging client, Skype™, email servers, and the like. It should be appreciated by one having ordinary skill in the art of modern contact centers that means are well established in the art for centers 100 to handle any of the many interaction types by which consumers now typically interact with contact centers 100, including but not limited to email, chat, instant messaging (IM), short message system (SMS), social media, and of course telephony of various types.

Center 100 receives "calls" normally at an automated call distributor (ACD) 120, a kind of specialized telephony switch (actually, a specialized private branch exchange or PBX) that not only can terminate voice calls arriving from PSTN 161 or Internet 160 but also is equipped with special software for queuing calls, transferring calls between stations within a center 100 (and often between ACDs 120 operating at different centers 100 of a single enterprise), and recording call detail records concerning when calls arrived, where they were sent, and how long they spent at the various points within center 100 where they were terminated. It is common in the art today for ACD 120 to connect, via a computer-telephony integration (CTI) link, to CTI server 121, such as a TServer from Genesys Telecommunications Laboratories, Inc. CTI server 121 receives notification events from ACD 120 concerning calls residing in ACD 120, and typically CTI server 121 sends standardized forms of these events to various client applications or devices within center 121, so that these applications can respond to telephony events. Examples of telephony events include arrival of a call at an ACD queue, establishment of a call at an agent phone 123, abandonment of a call while in queue, termination of a call at agent phone 123, and so forth.

Media types other than phone calls typically do not arrive at ACD 120 in modern centers 100, but instead arrive at a specialized software application designed to handle interactions of a specific type. For instance, email server 111 will typically handle incoming emails, chat server 112 will typically handle incoming chat sessions, instant messaging server 113 will handle incoming IM sessions, short message system (SMS) interface 114 will typically handle incoming SMS messages from PSTN 161 or Internet 160, and social media integration server 115 will typically handle inbound social media interactions. All of these servers and applications are exemplary in nature, however, as there are many variations that modern centers 100 can use to receive inbound communications in these and other media types, and of course all of them can equally handle outbound interactions of the particular type (inbound will generally be used for exemplary purposes, for simplicity, but nothing in the invention is limited specifically to inbound interactions). Also, in modern contact centers 100 non-telephony interactions are generally handled by an interaction server 125 rather than directly by CTI server 121. Interaction server 125 serves an analogous purpose for these media types as CTI server 121, although they often have additional, media-specific functions that in telephony interactions are handled by ACD 120 (for instance, in some cases interaction server 125 handles queuing of inbound non-telephonic interactions). It will be appreciated by one having ordinary skill the in the art that CTI server 121 and interaction server 125 are each examples of a general-purpose communication server, the function of which is to send notifications to clients and receive instructions from clients regarding communications of one or more media types.

Interactions in center 100 are often delivered to agent phones 123 or agent desktops 122 by basic queuing services provided by ACD 120 or interaction server 125 (depending on media type). But in more advanced centers, a specialized interaction router 130 is sent routing requests from either or both CTI server 121 or interaction server 125. When it receives these requests, interaction router 130 executes a script commonly known as a routing strategy to determine where to send the interaction in question. Interaction router 130 generally keeps track of the state of readiness of each of a plurality of agents, each associated with a desktop computer 122 and a phone 123, although sometimes this function is performed by a separate statistical server (not shown). Once a target is selected, instructions to route the interaction to that target are sent to the appropriate server (CTI server 121 or interaction server 125), which then sends the specific request (usually in a media-specific data protocol) to the appropriate media handling system (ACD 120, email server 111, and so forth). Note that in some centers 100 ACD 120 and one or more other media-specific services are delivered by an generalized media server (not shown); center 100's specific architecture and arrangement of components is illustrative only and essentially any internal structure of center 100 may be used according to the invention (since what is new lies outside of the center 100). In some cases agents may reside or work outside of center 100, generally working with a PC 170 and a landline telephone 171. One increasingly common variation of this approach is the widespread and increasing use of home agents to provide for more flexible staffing, lower costs, and better employee relations. Additionally, with the emergence of "smart phones", it is possible for agents to handle customer calls via mobile device 172, which could be a mobile phone equipped with the ability to run applications at the same time as handling calls (that is, a smart phone), or a tablet computing device.

Most contact centers 100 have one or more contact center databases 131 that store data pertaining to operations of the contact center 100. Contact center database 131 typically stores call detail records (when not stored directly by ACD 120), customer records useful for contact center operations, and configuration data pertaining to contact center 100, such as agent names, login credentials, skill assignments, and the like. There are many variations of data storage in contact centers 100, and in most cases there is more than one database 131. One general-purpose contact center database 131 is shown in FIG. 1 again as exemplary of a typical contact center 100, and nothing in the invention should be considered limited thereby. Finally, configuration server 132 is a component within a typical contact center 100 that is often subsumed into one or more other components but if highlighted here as a separate component for clarity of exposition. Configuration server 132 is generally the point through which all configuration-related requests are passed, even though generally all configuration-related data is stored in database 131. Usually this is done to allow configuration server 132 to verify access privileges of any persons requesting to view or change configuration data, to validate configuration data prior to entering it into database 131 (not least because database 131 error messages are typically general, whereas error messages from configuration server 132 will tend to be framed in "contact center language", such as "agent cannot have the same skill twice"). Also, configuration server 132 usually has the role of notifying all affected components when any configuration change is made, which often makes it possible for contact centers 100 to be operated in a quite flexible way.

According to a preferred embodiment of the invention, contact center 100 is not equipped with an on-premise screen capture capability (also no call recording capability is shown, and typically it will be operated as a cloud-based service in conjunction with the cloud-based screen capture solution of the invention). According to the embodiment, screen capture server 140 is operated separately (or off premise) from center 100, typically by a third party. Screen capture server 140 manages the overall screen capture process, according to the embodiment, including communicating with CTI server 121 and interaction server 125, as appropriate, to receive notifications of interaction arrivals and terminations, to receive requests to capture screens associated with an interaction (not all interactions will be "screen captured" in all contact centers 100, but some form of statistical sampling or on-demand screen capturing may be used instead, enabled by communications between CTI server 121 or interaction server 125 and screen capture server 140). Web server 150 is a conventional web server known in the art, such as Microsoft Internet Information Server or Apache Web Server; similarly, web application server 151 is a conventional web application server such as Tomcat or JBoss, and serves to host web applications 152 that are accessed by users via conventional web browsers interacting with web server 150. These are conventional web components, which in an embodiment of the invention are used to host and deliver web applications necessary to provide a cloud-based, "zero footprint" screen capture service accessed through an agent's browser. "Zero footprint" here is used in the conventional sense that applies in the art of enterprise software, where it means "does not require any permanent installation of software or any manual installation steps". Specific details of how web server 150 and web application server 151 are provided below.

Media upload server 141 is normally, although not necessarily, a cloud-based server that receives uploads of call recordings and screen captures from contact center 100 (although it should be understood that in some embodiments media upload server 141 may receive screen captures from multiple unrelated centers 100). Uploaded call recordings and screen capture recordings are stored in media storage database 142. Database 142 is in some embodiments a conventional relational database management system such as Oracle, while in other embodiments it is a distributed, non-relational data storage system such as Hadoop. It should be appreciated by one having ordinary skill in the art of data systems that the invention is not limited to any particular form or architecture of database, but may be implemented using any data storage system that provides the required scale and security features needed for a particular implementation (and of course there are other considerations that might drive such a choice as well).

Figure 2:
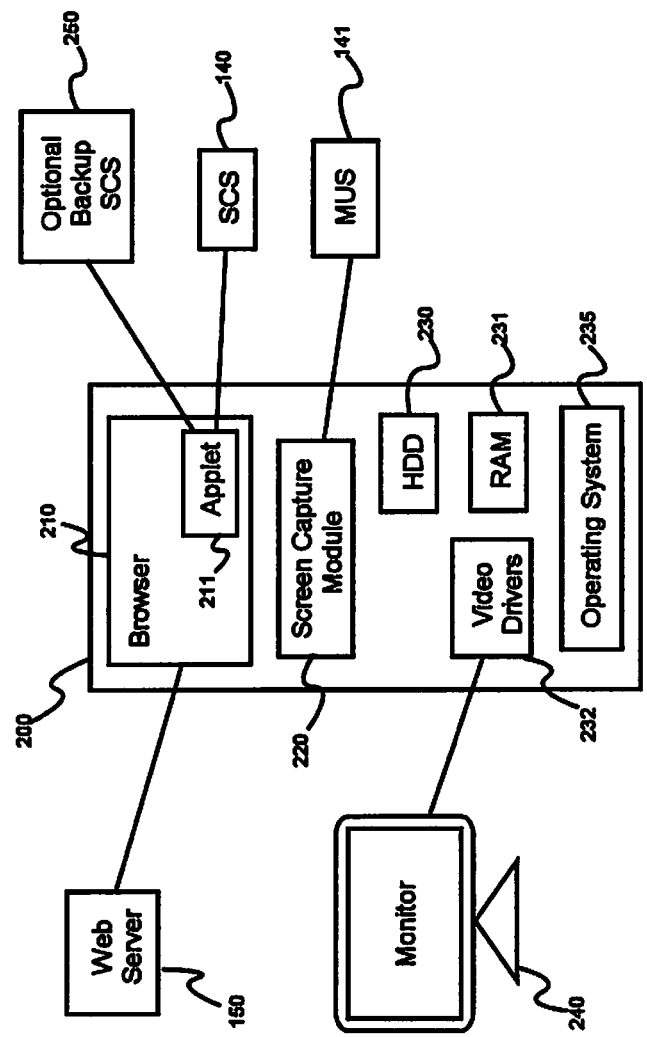
FIG. 2 is a block diagram illustrating an agent workstation according to the invention, and its connections with other systems.

FIG. 2 is a block diagram illustrating an agent workstation 200 according to the invention, and its connections with other systems. In some embodiments, agent workstation is deployed onsite at a contact center 100 (like the agent workstation containing agent PV 122 and agent phone 123), while in other embodiments agent workstation 200 is deployed outside contact center 100, for example at an agent's home or in a small office (analogous to agent PC 170 and agent phone 123 in FIG. 1). As shown in FIGS. 1 and 2, agent workstation 200 may be coupled via a data network (for example Internet 160 or a corporate network) to web server 150, media upload server 141, and screen capture server (SCS) 140 and optionally to a backup SCS 250).

Agent workstation 200 comprises a computer that is connected to at least one monitor 240 or equivalent graphical interface element. According to a preferred embodiment of the invention, agent workstation further comprises an operating system 235, such as any of the Microsoft Windows versions, Mac OS/X, some flavor of Linux, or indeed any operating system capable of hosting a browser 210 and other independent programs, and of driving graphical content to a monitor 240 or equivalent using video drivers 232. It will be appreciated by one having ordinary skill in the art of operating systems that video drivers 232 are sometimes considered part of operating system 235, and sometimes are considered as standalone software modules. Either mode is suitable according to the invention. Agent workstation further comprises one or more of random access memory (RAM) 231 and hard disk drives (HDD) 230, although any suitable memory technology, including but not limited to Flash memory and three-dimensional semiconductor memory (for example memristors) may be used without departing from the scope of the invention.

In some embodiments more nontraditional agent workstations may be used, such as tablet computing devices like Apple's iPad™ series. In these embodiments, each of the components shown in FIG. 2 will still be present, although possibly with other names, and possibly combined. For example, on an iPad™, RAM 231 and HDD 230 are replaced by a single memory system based on solid state Flash memory, and monitor 240 is integral to agent workstation (it is the front side of the iPad™). It will be appreciated by those having ordinary skill in the art of computer engineering that any computing device equipped with a screen (without which "screen capture" does not make sense!), at least one video driver 232, some form of memory 230, 231, and operating system 235 (iOS in the case of an iPad™), and at least a browser 210 capable of hosting digitally signed software and allowing for download of executable components with suitable security precautions.

Agent workstation will, when screen capture operations are taking place in accordance with the invention, further comprise at least one running browser 210, which while an agent is logged in to contact center 100 will host an applet 211 or other downloadable code module, and a screen capture module 220. Screen capture module 220 is coupled via the Internet 160 or another network to media upload server 141, in order to be able to upload content from screen capture operations to MUS 141.

In some embodiments it is only desirable to record screen capture video from an agent's computing device 200 while the agent is on a call with a customer, since during times when an agent is not on a call with a customer (or performing work related to a customer call), they may be involved in activities that are not necessary to record. In some cases, as when agents are working at home, it may even be potentially illegal to record screen activities on a private computing device 200 when work is not being performed. In some cases, though, it may be desirable to record screen capture videos even when no call is in progress (for instance, when an agent is using a company-owned computer and is doing work that needs to be measured essentially all the time the agent is logged in to her computing device 200).

In order for a "zero footprint" screen capture system according to the invention to work, a means must usually be available to associate an agent's computing device 200 with the same agent's phone 171, 172, or 123. This is because, quite often, the first indication that a system operating according to the invention will have of the arrival of a telephone call at an agent, and because often it will only be desirable to record screen captures while a call is in progress. Such a means would not be necessary in cases where screen capture recording are to be made without regard to the state of telephonic activity at agent workstation 200; for instance, if insurance claim adjustment work not involving phone calls is to be monitored using screen capture recordings.

Figure 3:
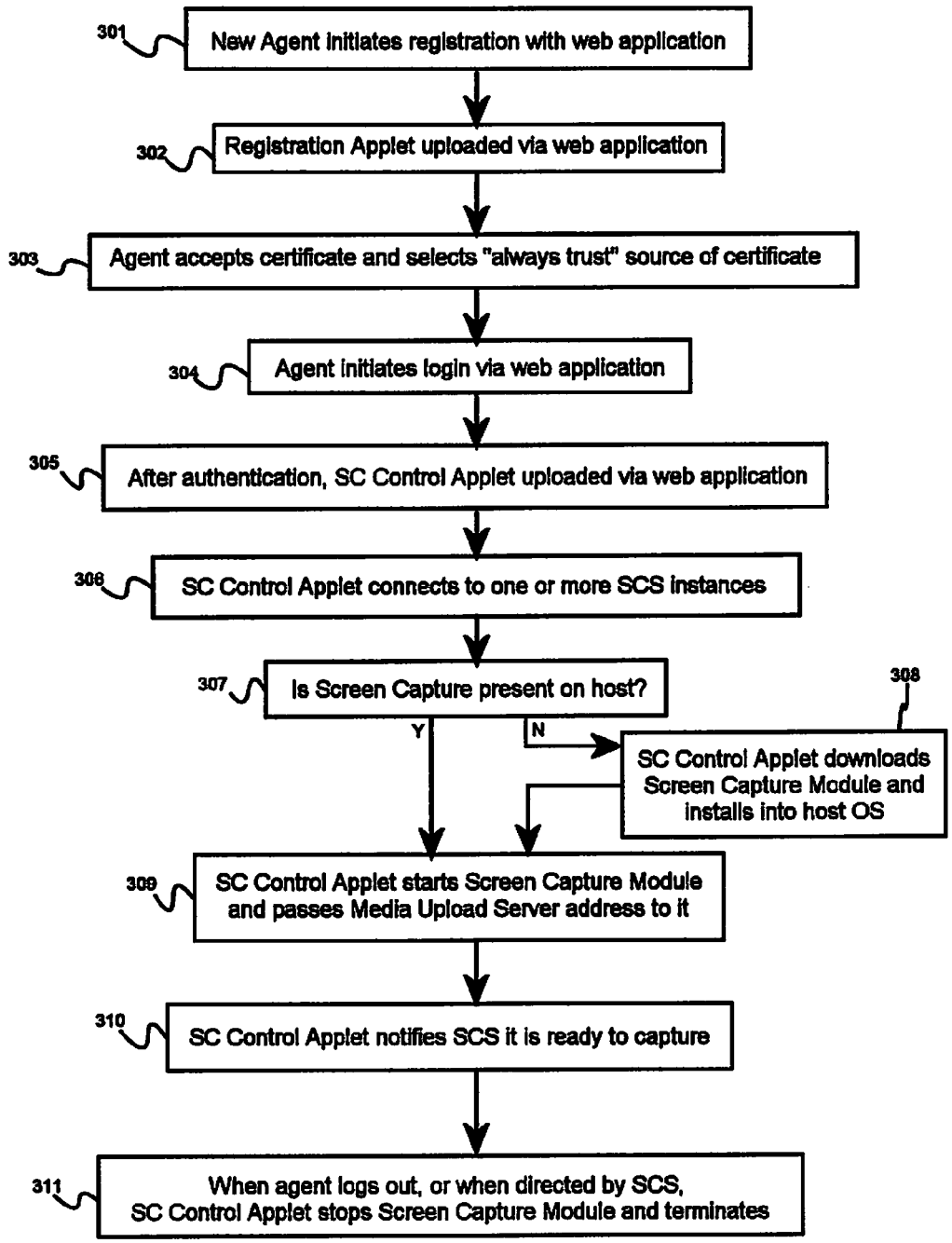
FIG. 3 is a process flow diagram illustrating an agent registration and login process according to an embodiment of the invention.

Accordingly, FIG. 3 is a process flow diagram illustrating an agent registration and login process according to an embodiment of the invention. In step 301, which is typically executed only once when an agent first is added to the system (or when an agent changes workstations 200), a new agent initiates registration using a web page displayed in browser 210. The web page is served by web server 150, which invokes a registration application 152 hosted by web application server 151. In a preferred embodiment, web application server 151 provides an agent application 152 that is used for all agent activities conducted according to the invention. Such web-based agent applications are typical and well known in the art, and may use methods such as providing a series of tabs to allow a rich variety of functionality to be made available to agents within a single application while keeping the user interface ergonomically satisfactory. Of course, agent web application 152 can be implemented using any technology suitable for building web-based user interfaces, including but not limited to the Microsoft .NET Framework, Microsoft Silverlight technology, Active Server Pages, Java applications, Javascript code, PHP code, Adobe Flash, HTML 5, and the like—a person having ordinary skill in the art of web interface design will appreciate that there is a rich variety of technologies and tools available to build rich user interfaces, any of which may be used according to the invention without departing from the scope of the invention. When an agent registers in step 301, normally the agent will be assigned an agent identification number (often referred to as AgentID), although in many embodiments an agent will have been assigned an AgentID by ACD 120, and this AgentID will have been provided to the agent before step 301, so that the agent may enter the AgentID in step 301. Either way, at the conclusion of step 301 an association is made between workstation 200 (generally—but not necessarily—based on its IP address) and a particular agent (based on AgentID).

In an embodiment, after an agent registers in step 301, a registration applet is uploaded under control of agent web application 152. Since generally the applet will be new to a particular agent/workstation combination (since the agent just registered for the first time from the particular workstation 200), in step 303 the agent will be presented with a popup or dialog box that informs the agent that the applet is a signed application, and asking whether the agent wishes to accept the digital certificate associated with the application. Normally, when an agent has been trained on what to expect, an agent will select "always trust the source of the certificate" or an equivalent choice, which means that future uploads of applets from web server 150 will not trigger a certificate acceptance prompt to the agent. Steps 302-303 are not mandatory according to the invention, as there are other ways known in the art to establish web server 150 or web application server 151 as trusted sources for signed applications, any of which may be used. And, even if no equivalent of these steps is performed, one can still carry out the invention, with the only difference being that instead of "zero footprint" the screen capture service will have a very small footprint, requiring an extra step of accepting download of an applet each time an agent logs in. Once steps 301-303 are completed, an agent is fully registered and the agent's AgentID is associated with workstation 200, and accordingly the agent is ready to use workstation 200 to handle customer calls (incoming or outgoing). In some cases, an AgentID is tightly associated with a particular workstation 200, but according to the invention it is possible to allow agents to use their AgentID and work at any workstation 200 (as long as there is a way to associate AgentID and workstation 200 address at the time work is performed, there is no problem). Also, generally each particular phone 123, 171, or 172 is associated with a particular workstation 200. Note that many variations on certificate registration processes are possible according to the invention; for example, in some embodiments certificates are viewed and accepted by agents when the agents initially configure their workstations for contact center work, and no mention is made of any screen capture application during such registration (although typically non-technical means such as employment contracts will advise agents that their actions may be monitored as well as their audio). Thus in some embodiments of the invention agents' activities may be monitored via screen capture without the agents' ever having any indication that such activities are taking place (that is, truly "zero footprint" screen capture operations are possible according to the invention).

Each time an agent begins a work session, in step 304, the agent initiates login via web application 152. Login is typically accomplished by entering the agent's AgentID and a password. Logging in as in step 303 creates an immediate association between the agent's AgentID and the address of the workstation 200 where the login takes place. This allows events pertaining to a phone 123 to be associated with actions taken on workstation 200, and both to be associated to an agent identified by a particular AgentID, and thus allows all of the events and actors involved in serving a customer to be correlated with each other. After an agent logs in, in step 304, in step 305 screen capture control applet 211 is uploaded via web application 152 to workstation 200. Since in most cases in step 303 the web application server 151 had been permanently approved as a source for delivering digitally signed code, screen capture control applet 211 is uploaded in the background without any agent action or awareness required. Note that while the term "applet" is used here, it does not necessarily imply a "Java applet", but refers to any executable code that can be signed, downloaded via a web page, and executed within a browser 210 on the target machine 200. When screen capture control applet (SCCA) 211 is uploaded, it runs and immediately, in step 306 screen capture control applet 211 connects to one or more screen capture server instances 140, 250. In some embodiments, SCCA 211 attempts to connect first to a primary SCS 140, and if it succeeds then it does not connect to any others; if connection to SCS 140 fails, SCCA 211 would then attempt to connect to a backup SCS 250. In other embodiments, SCCA 211 will connect, if possible, to both SCS 140 and backup SCS 250, in order to use a "hot standby" mode of redundancy. It should be appreciated by one having ordinary skill in the art of distributed computing that there are many arrangements that can be made to provide a high degree of confidence that SCCA 211 will be able to connect, and remain connected, to at least one SCS 140, and any of these various approaches may be adopted without departing from the scope of the invention. Additionally, while normally SCCA 211 will, when uploaded, contain information provided by web application server 151 that describes connection parameters needed to connect to SCS 140 in step 306 (for example, a hostname and port combination that describes particular port on a particular machine where SCS 140 will be listening for new connections), in some embodiments connection information may be stored locally on workstation 200 or acquired in some other way, without departing from the scope of the invention.

Once SCCA 211 is downloaded and connected to at least one SCS 140, it checks (step 307) whether any screen capture module 220 is present on workstation 200. In some cases, as will be seen below, screen capture module 220 is left on workstation 200 after its initial installation (while in other cases it is deleted after it is used, to be downloaded each time it is needed). It is because of this that the possibility exists that screen capture module 220 is already present on workstation 200, and hence SCCA 211 checks first. If in fact screen capture module 220 is already installed, step 309 is executed next; but if screen capture module 220 is not already installed, in step 308 SCCA 211 downloads and installs into host operating system 235 screen capture module 220. Screen capture module 220 is executable code capable of being installed at least into memory 231 or installed directly onto hard drive 230, which may be a standalone executable, a service that can be installed directly into operating system 235 (for instance, a Windows service), or any other form known in the art by which executable code can be installed, even temporarily, on a workstation 200 using operating system 235. In a preferred embodiment, screen capture module 220 is a standalone Windows executable that is downloaded by SCCA 211 and installed (because SCCA 211 is a signed application, it can exercise a privilege level sufficient to allow it to install programs onto workstation 200) and run as a Windows service. Once screen capture module 220 is installed in step 308, step 309 is executed. In step 309, screen capture control applet 211 starts screen capture module 220 and passes at least one address of a media upload server 141 to it. Once startup of screen capture module 220 is confirmed, in step 310 SCCA 211 notifies SCS 140 that it is ready to conduct screen capture operations on request. While the process of actually starting and controlling screen capture operations will be discussed with respect to FIG. 4, it is helpful here to discuss what happens when an agent ends a work session and logs out. In step 311, when an agent logs out, or when otherwise directed by SCS 140, SCCA 211 stops screen capture module 220, optionally uninstalls or deletes it, and then terminates itself, returning workstation 200 to the condition it was in prior to agent login in step 304 (with the possible exception of having left behind a copy of screen capture module 220, which is an option that may or may not be used, at the discretion of each entity using a system according to the invention).

Figure 4:
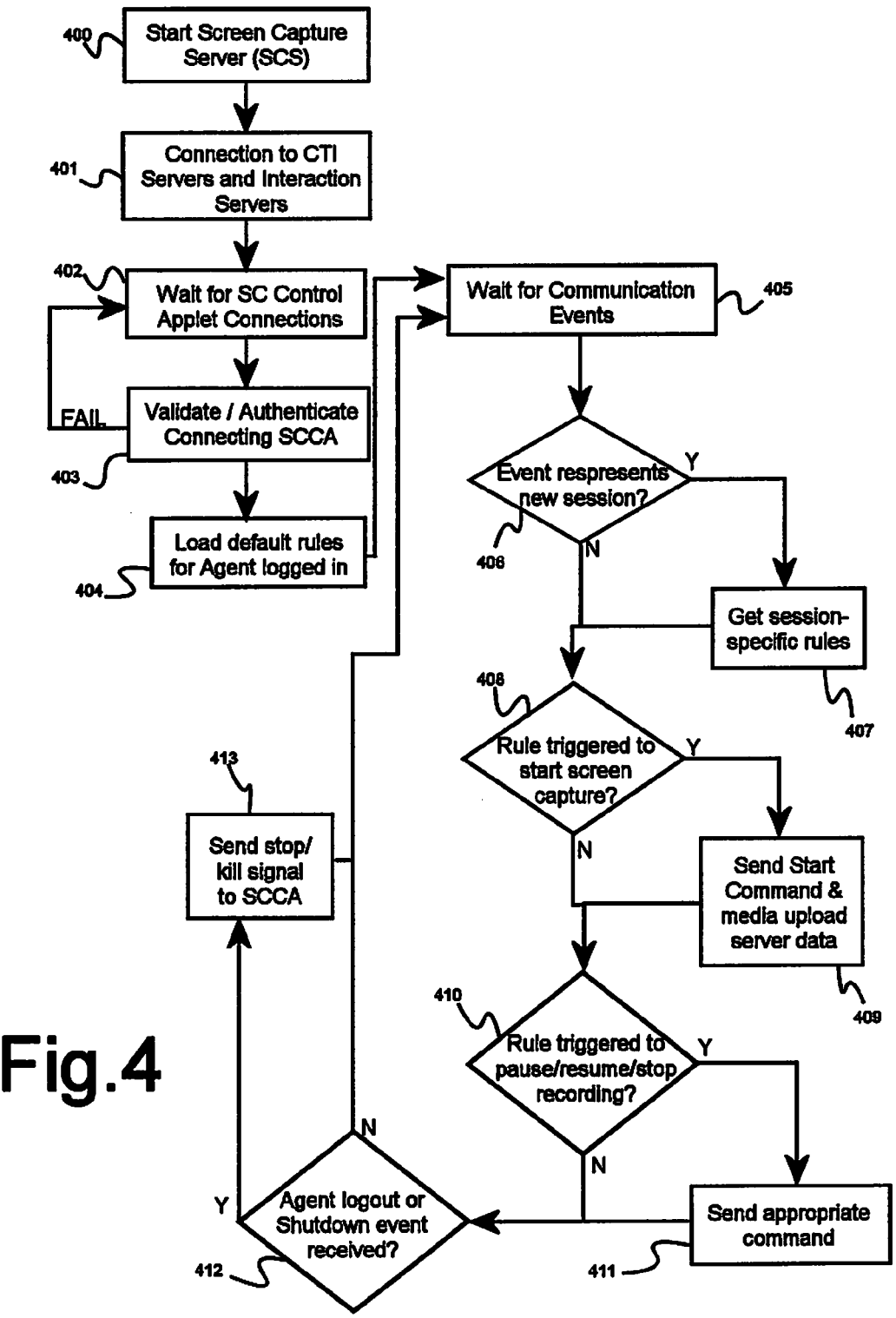
FIG. 4 is a process flow diagram illustrating operations of a screen capture server component in an embodiment of the invention.

FIG. 4 is a process flow diagram illustrating operations of screen capture server 140 according to a preferred embodiment of the invention. In initial step 400, SCS 140 is started. Then, in step 401, SCS 140 connects to CTI server 121 and interaction server 125. In some embodiments, SCS 140 will connect to a plurality of CTI servers 121 and a plurality of interaction servers 125; according to the invention, any number of each may be connected to (including for example two CTI servers 121 and zero interaction servers 125); what is important is that a connection is made to each server 121, 125 from which events are to be received and from which requests to start or stop screen capture recording will be received. Once started and connected to any required CTI servers 121 and interaction servers 125, SCS 140 waits in step 402 for connections from screen capture control applets 211 (initiation of such connections was discussed with reference to FIG. 3 above). Each time a screen capture control applet 211 attempts to connect, in step 403 the applet is validated (for example, did the request to connect come from a known workstation 200?) and possibly authenticated (typically using an application identifier and an encrypted password or passcode that has been preconfigured); if validation/authentication fails, execution passes back to step 402. When a screen capture control applet 211 has successfully connected and been validated in step 403, then in step 404 default rules for handling the particular agent associated with the workstation from which SCCA 211 connected are optionally loaded by SCS 140. Agent-specific rules could comprise rules such as "always record every call handled by this agent and capture the associated screen activities", or "record and capture calls and screen activity for 25% of calls handled by this agent, and provide the agent a 'push to record' button to allow this agent to initiate recording independently", or "only record VIP calls to this agent"; it will be appreciated that any number of possible rules can be specified, using any desired rule formats—ranging from simple plain text with delimiters to complex data structures loaded from a database and containing many rules—without departing from the scope of the invention. According to a preferred embodiment of the invention, and in keeping with rules management approaches commonly used in contact centers, default site-wide rules may also be established, so that for agents that do not have agent-specific rules, these default site-wide rules will be used. Furthermore, in some embodiments recording rules can also be established for different types of interactions, and rules can be specified that govern conflicts between rules (for example, "when agent-specific rules and call-specific rules conflict, always elect to record whenever either rule requires it", or "always give call-specific rules priority, and override agent-specific rules when a non-zero set of call-specific rules exists").

Once step 404 has been completed, the screen capture recording system is fully prepared. In some embodiments, all activity on a logged in agent's workstation 200 will be recorded, regardless of whether an interaction is in progress or not; for these embodiments, recording starts after step 404 and continues until an agent logs out. Otherwise, in step 405 SCS 140 waits for communications events to arrive from one or more of CTI servers 121 and interaction servers 125. When an event is received, in step 406 SCS 140 determines whether the event received corresponds to a beginning of a new session or interaction. If it does, then in step 407 optional interaction-specific (i.e., call-type specific) rules may be loaded. Then, in step 408, SCS 140 evaluates all active rules (for example, site-specific, agent-specific, call-type specific and even single-session-specific) and applies any rules conflict rules (that is, rules that themselves govern how to resolve conflicts between other rules), to determine whether the received event satisfies any rule that requires screen capture operations to start. If they do, then in step 409 SCS 140 sends a "start" command to SCCA 211, and optionally includes with the command data pertaining to a media upload server 141 to which any resulting screen capture data is to be uploaded. SCCA 211 passes data pertaining to media upload servers 141 to screen capture module 220 either when it starts screen capture module 220 (as described above) or when a new recording is started (as just described), or both. In some embodiments, screen capture module 220 is provided with a MUS 141 address on startup so that, if no MUS 141 data is provided with a start command, it is still possible to capture and upload screen data. In this way, "command by override" is implemented, since if—for load balancing or any other purpose—SCS 140 determines that a specific MUS 141 should be used for a specific recording, it may send the appropriate MUS 141 connection data with the start command; otherwise, it need not send any MUS 141 data and screen capture module 220 will upload to the MUS 141 whose connection data it was given at startup. After step 408 and optionally step 409, in step 410 SCS 140 determines whether the received event triggers any rule to stop recording and, if so, in step 411 it send an appropriate command to the relevant SCCA 211. Then, in step 412, SCS 140 checks whether the received event corresponds to an agent logout or workstation 200 shutdown event (or indeed a browser 210 shutdown event), and if so sends, in step 413, a stop or kill signal to SCCA 211 to instruct it to carry out its termination process (step 311 in FIG. 3). After handling a received event by working through steps 406-413, control returns to step 405, and SCS 140 waits for another event (although it should be noted that event handlers could be operated each in its own thread, according to techniques well known in the art of event-based programming, and therefore steps 406-413 could proceed in an independent thread while in step 405 SCS continues without interruption to await new incoming events from CTI servers 121 or interaction servers 125.

With the detailed explanations pertaining to FIGS. 3 and 4 in mind, operation of a system according to the invention can be understood clearly. Walking through an example, first a registered agent logs in using a browser-based interface, and makes herself ready to answer calls from customers. While logging in, and without any action required on the part of the agent, the web application through which the agent logs in downloads an applet that manages screen capture operations. The applet connects to one or more screen capture servers, which are in turn connected to various media servers (such as CTI server 121 or interaction server 125) and are thus able to receive notification events pertaining to customer interactions. The screen capture control applet 211 then causes the download and installation (if necessary) of a screen capture module 220 that will be used to actually interact with video drivers 232 to capture video data (i.e., to "capture screen activity data"; screen capture techniques are well established in the art). Then, when a customer calls in, it may be routed to an agent, and as it is being sent to the agent's phone, a data message is typically sent to the agent's desktop (from CTI server 121 in this example) that causes a screen pop to occur. At substantially the same time, screen capture server 140 receives notification of the call's delivery to an agent, and based on one or more rules determines that the call should be recorded, including any screen activity undertaken by the agent. Screen capture server 140 therefore sends a message to screen capture control applet 211 telling it to start screen capture operations, and SCCA 211 sends a start message to screen capture module, which connects to a media upload server and begins transmitting captured screen activity data. When the customer call completes, again a message is sent by CTI server 121 to screen capture server 140 announcing the end of the call; screen capture server 140 sends a stop command to SCCA 211, which in turn tells screen capture module 220 to stop capture operations. Depending on configuration, screen capture module 220 may continue to upload already-captured video or graphics data to media upload server and, upon completion of all buffered uploads, it then ceases activity and waits for another call (actually, it waits for another start message from SCCA 211). When the agent later logs out, screen capture module 220 may be uninstalled and deleted, or may simply cease operating until the agent logs back in; SCCA 211 usually unloads when the agent logs out and thereby leaves the web application used for agent contact center work.

Figure 5:
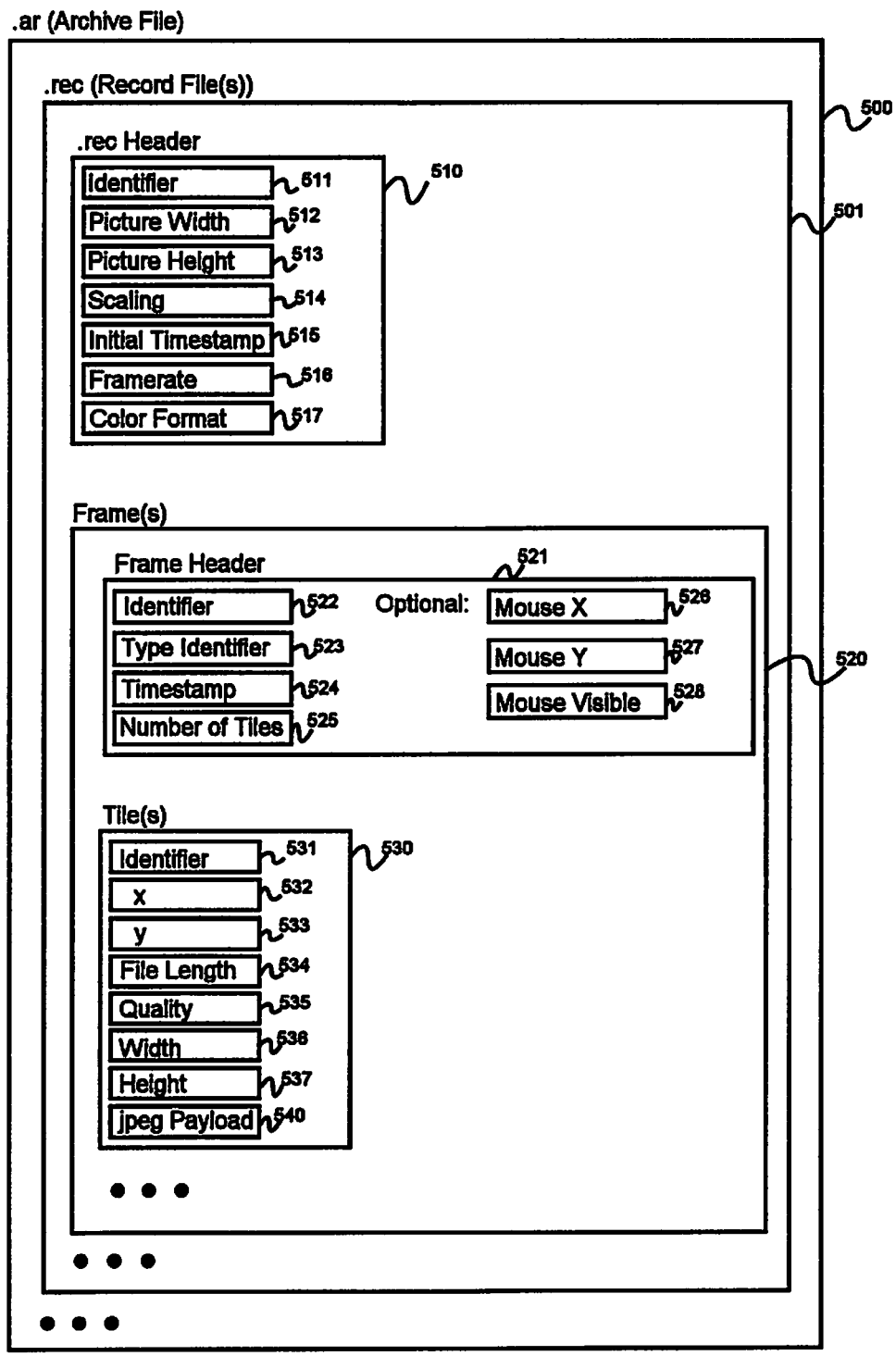
FIG. 5 is a diagram illustrating a protocol used for communicating screen capture data, according to an embodiment of the invention.

FIG. 5 is a diagram illustrating an exemplary protocol used for uploading captured screen graphics data to media upload server 141, according to an embodiment of the invention. It is generally necessary to break screen capture data into "chunks" of manageable size, to ease the management of bandwidth between screen capture module 220 and media upload server 141. Accordingly, a protocol such as that illustrated in FIG. 5 that allows for transmission of screen capture data in a flexible way is desirable. According to a preferred embodiment of the invention, screen capture data is sent as a succession of "jpg" files, which when viewed collectively and in sequence represent a video of what an agent did on workstation 200 during one or more customer calls (or while doing non-call-related work). Screen capture data is packaged, according to the protocol known as "BG300", into archive files 500 with a file extension of ".ar". Each archive file 500 comprises a plurality of record files 501 with file extension ".rec", each of which represents a single contiguous block of recorded video. In some cases a succeeding .rec file will have video that starts immediately after the conclusion of a previous .rec file, and the two (and potentially more) files together represent a single larger contiguous video recording. However, in some cases one .rec file may end at a particular time, and an immediately subsequent .rec file might start at some later time; this can occur, for instance, when there is an actual pause in action during a call or other period to be recorded. In a preferred embodiment, if nothing is changing on an agent's desktop (for instance if an agent has stepped away to confer with a colleague), then nothing is recorded by screen capture module 220, and a period of "dead air" will occur which would make a natural boundary for separating two .rec files, one ending at the beginning of the idle period and the other starting at the end of the idle period.

According to a preferred embodiment, each .rec file begins with a .rec header 510, which contains information pertaining to the entire .rec file. A .rec header 510 will typically comprise an identifier 511 that uniquely identifies the file as a .rec file for use with the invention, a picture width 512 that specifies a width (typically, but not necessarily, in pixels), a picture height 513 that specifies a height (also typically, but not necessarily, in pixels), a scaling factor commonly defined as 100*percent scaling relative to an initial picture size (so that 50 means the captured video is scaled to 50% of its original size), an initial timestamp 515, a frame rate 516 that specifies a number of frames that were recorded per unit time, and a color format 517 that typically uses a single bit or a pair of bits to distinguish between two or four alternative color formats that might be used when recording video (there could be more variations, as many different color coding schemes are known in the art of computer graphics, and color format field 517 needs to be at least large enough to allow specification of all color formats that might be used in a particular embodiment). In a preferred embodiment of the invention, identifier 511 corresponds to a magic number selected so as to uniquely identify record file 501 as a data file corresponding to a specific protocol (in this case, the protocol defined by FIG. 5).

Each record file 501 continues, following its header 510, with a series of frames 520. Each frame corresponds to a single snapshot of an agent's screen on monitor 240 at workstation 200, and accordingly each record file 501 will contain a number of frames 520 equal to its frame rate 516 (recorded in record file header 510) times the length of time of the video recording contained in record file 501. Each frame begins with a frame header 521 that stores data applicable to the entire frame. In a preferred embodiment, frame header 521 comprises at least an identifier 522, a type identifier 523, a timestamp 524, and a number of tiles 525. Identifier 522 again uses a magic number to positively identify frame 520 as being a frame corresponding to a specific protocol, in this case the protocol illustrated in FIG. 5. It will be appreciated that use of "magic numbers" to uniquely identify content types is a well-known technique in the art of data encoding, and that any method of positively identifying payloads of record files, frames, and indeed tiles within frames may be substituted without departing from the scope of the invention. Type identifier 523 is used to distinguish between two types of frames 520—those that record a position for a mouse cursor and those that don't. A mouse cursor is a well known element of computer user interfaces, and in some embodiments it is desirable to include a location of a mouse cursor and its visibility so that a corresponding mouse cursor can be shown (or not) on a screen being viewed by a person viewing a video replay of a series of screen captures that display what happened on an agent's monitor 240 during a customer call. For those frames which are to include mouse cursor information (as indicated by the value of type identifier 523), an additional set of data elements will be present in frame header 521, specifically a mouse X position 526, a mouse Y position 527, and a mouse visible flag 528. Again, in some embodiments additional data elements may be present without departing from the scope of the invention.

Following frame header 521, each frame comprises a series of tiles 530. Each tile 530 comprises contextual data and graphics data that correspond to a two-dimensional rectangle, or tile, of agent monitor 240. Each frame 520 can be represented by a series of equally sized tiles 530, for example where monitor's visible region (which is universally rectangular in shape) is divided in 12 tiles, in three rows of fours tiles each. In other cases, not all tiles 530 are the same size. For example, it may be desirable to have tiles of different sizes and of different graphics quality, each used for different regions of monitor 240. For instance, if a certain region on monitor 240 comprised text at the moment when a screen capture was taken, and the rest of the real estate on monitor 240 was essentially featureless, then it would make sense to have one or two high-quality tiles 530 that fully overlay the area comprised of text, and then to have a series of low quality tiles 530 to capture the surrounding featureless terrain. Another approach would be to have a single low-resolution tile spanning the entire monitor 240, and then overlay a high-resolution tile 530 corresponding to the area comprised of text. Similarly, areas where a high rate of change in graphical content is observed could be covered by tiles 530 of higher video quality, whereas regions where little change is observed could be covered by larger tiles 530 with low graphics quality. It should be clear to one having ordinary skill the art of graphical compression that there may be several alternative approaches to consider when implementing a tiling process, depending on the nature of the underlying graphical content to be captured, and any of those approaches may be used to determine tiling within a frame according to the invention.

Figure 6:
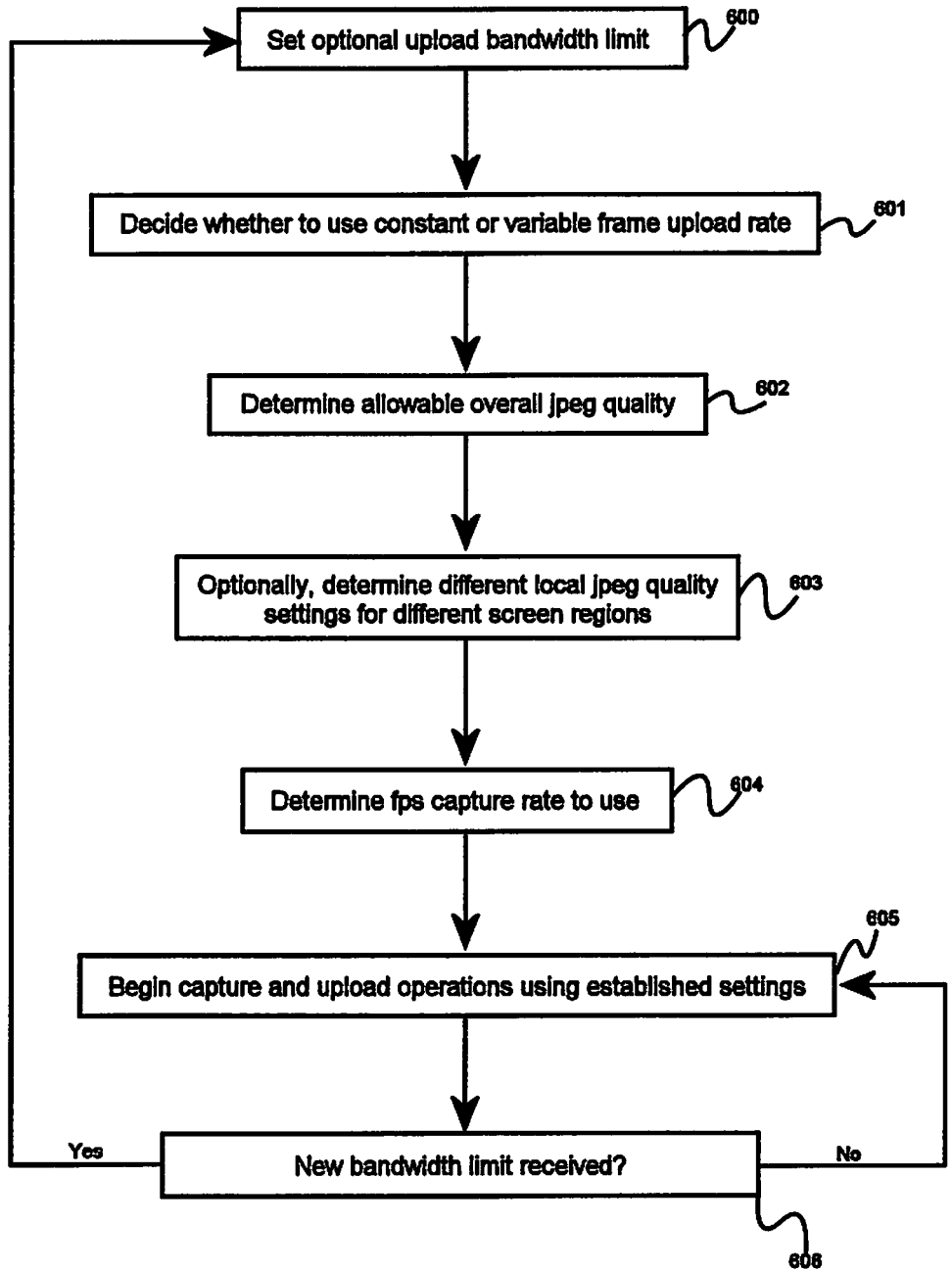
FIG. 6 is a process flow diagram illustrating a technique for managing bandwidth use during screen capture operations, according to an embodiment of the invention.

In many situations, it will be desirable to limit the instantaneous bandwidth being used by screen capture graphics transmission. For example, if a VOIP telephone is being used by an agent, it will likely be necessary to limit bandwidth use for screen capture video transmission during a call, in order to avoid call audio quality degradation. Accordingly, FIG. 6 illustrates an exemplary process, according to the invention, for managing bandwidth during screen capture operations. In a first step 600, an optional upload bandwidth limit is set. In some situations no bandwidth limits are required, for example when an agent has an excellent data connection and uses a conventional phone. Where bandwidth is required to be limited, however, a fixed bandwidth limit may be set in step 600, or a functional bandwidth limit may alternatively be set. A functional bandwidth limit would be, for example, a limitation that stated that packet jitter for voice signals cannot be allowed to exceed some predetermined level. In such a case, packet jitter would be measured periodically and, as it approached the specified limit, bandwidth for other uses (including of course screen capture video transmission) would be throttled. In step 601, a determination may be made to maintain fixed frame rate or to vary frame rate for upload purposes. Since bandwidth used will always be determined at least by frame rate and the size of data payload of a frame, allowing upload frame rate to vary will allow bandwidth to be varied. A possible disadvantage of adopting a variable frame rate approach is that, if upload frame rate is kept low for a long period, a significant backlog of frames waiting to be uploaded may accumulate on workstation 200, with the result that either significant resources must be allocated on workstation 200 to buffering video frames, or that upload operations will be required for a significant period after a call completes (to allow buffered frames to "catch up"), which could limit flexibility in operation of agent workstation 200 (for instance, if an agent wanted to restart workstation 200, it might be necessary to delay restart to allow time for uploading to complete). An alternative to using variable frame rates to control bandwidth is to use variable jpeg quality, since lower jpeg (graphics) quality requires less data (and therefore less bandwidth). Accordingly, in step 602 an acceptable overall jpeg quality setting is determined (lower values means less bandwidth, and vice versa). Of course, if lower overall graphics quality is needed, according to the invention it may still be desirable to maintain high graphics quality for certain screen regions and to dramatically lower graphical quality for others, based on characteristics of those regions. If this approach is used to get better overall results, in step 603 local jpeg quality settings are determined for different screen regions. Another clear way to conserve bandwidth (or conversely to use available bandwidth fully) is to vary video frame rate. Simply, reducing frame rate by half immediately reduces bandwidth required by half, so adjusting frame rate in step 604 can be a very effective bandwidth management tool. Of course, the lower frame rate goes, the lower the quality of video will be that is available to be viewed by quality monitors, with resulting potential loss of ability to detect and correct quality problems (which is, after all, a main purpose of capturing screen video!). Once a group of settings has been selected in steps 601-604, in step 605 screen capture and video upload operations begin using those settings. Periodically, in step 606, it may be desirable to check whether new bandwidth limits have been received from screen capture server 140 or from the agent (who is, in some embodiments, provided with a "call quality" button, for example, that when pushed initiates a series of steps to improve call quality, including possibly limiting bandwidth available for video uploads). If changes are indicated, then the process begins again at step 600; if not, video capture operations continue with current settings and the process moves back to step 606 until the next time it is desired to check settings.

In some embodiments a buffer is maintained in memory (typically RAM 231, although HDD 230 or other memory types could also be used) for storing frames that have been captured but not yet transmitted to media upload server 141. Buffers will typically be used when bandwidth is throttled in step 601 and screen capture operations generate more screen graphics data per unit time than can be transmitted within a given bandwidth limit. In some embodiments a buffer of fixed size will be maintained in memory 231, while in other cases a buffer will grow and shrink as needed, although it may still be limited to some maximum size. In some cases, buffered data will be written to hard drive 230 when a buffer exceeds some size, or when uploading operations have been terminated (which can occur when connection to MUS 141 is lost, or when agent workstation 200 is shut down by an agent), so that, when screen capture operations resume at a later time, previously buffered data can be retrieved and sent to MUS 141. Note that in some embodiments buffered data will often be "tagged" with an identity or connection information of a particular media upload server 141 so that the associated data will all be sent to the same MUS 141; if this is not done, it will be necessary in some cases to reassemble capture screen video recordings from data chunks stored on a plurality of media upload servers 141.

Since it will rarely be possible to provide unlimited bandwidth for screen capture video uploads, it will often be the case that, when a customer call is completed at agent workstation 200, screen capture video upload operations are still ongoing. Similarly, when an agent logs out, there may still be some amount of video to be uploaded, and it generally would be desirable to complete such uploads before allowing an agent to shut down their machine for example. And, it is often just as important that screen capture operations themselves (that is, capturing of screen shots into screen capture videos, rather than uploading operations) should be affirmatively stopped once an agent logs out or ends a call, particularly if agent workstation 200 is actually owned by the agent (as is common in the case of home agents), since it will rarely be desirable for a company to capture screen activity not associated with its particular work requirements (such potentially unauthorized screen captures could represent a legal risk for the company). Accordingly, FIG. 7 illustrates an exemplary process, according to an embodiment of the invention, providing various methods of terminating screen capture operations.

Figure 7:
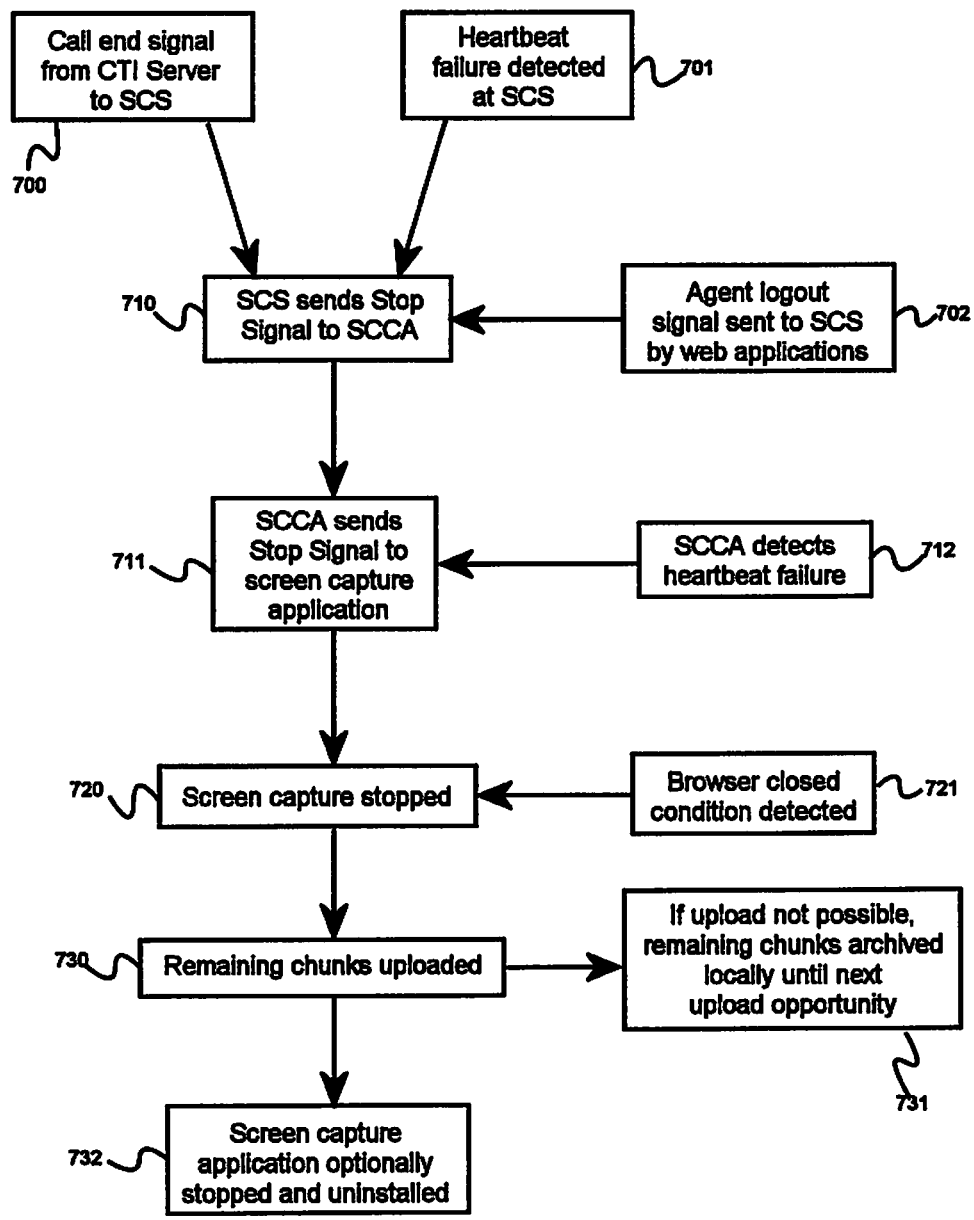
FIG. 7 is a process flow diagram illustrating various methods of terminating screen capture operations, according to various embodiments of the invention.

According to the embodiment, several conditions can trigger the screen capture shutdown process illustrated in FIG. 7. In step 700, which typically represents a typical shutdown mechanism, CTI server 121 sends an event notification to SCS 140 when a call on ACD 120 is completed; in step 701 a heartbeat failure is detected at SCS 140; and in step 702 an agent logout signal is sent to SCS 140 by a web application 152 used by agents for interaction during interaction with customers. Each of these three signals indicate a condition in which cessation of screen capturing may be required. In the case of call completion (step 700), rules governing screen captures at a site or agent level typically require that screen capture be conducted only during customer calls or other customer interactions, although in some embodiments it is desirable to capture all activity on agent workstation 200, regardless of whether it is related to a customer interaction. When the first condition applies, each time a customer interaction is completed, SCS 140 sends a "stop" signal in step 710 to SCCA. Similarly, in some cases when a heartbeat failure is detected at SCS 140 it may be desirable to send a stop signal in step 710. This will also not always be the case, however, since in some cases SCCA 211 is connected to more than one SCS (for example, to backup SCS 250), and failure of a heartbeat signal at a first SCS 140 does not necessarily mean failure of heartbeat at a backup SCS 250 (heartbeat signals are well known in the art, and are typically trivial datagrams sent at a predetermined periodicity from one software application to another, and then replied to by the second software application; when the second application receives a heartbeat signal, it knows the first application is still running and connected, and when its reply is received the first application knows the second one is still running and connected). In most embodiments, when an agent logs out at workstation 200, and a corresponding signal is sent to SCS 140, SCS will send a stop signal 710 to SCCA, particularly since it is usually not desirable (being typically inefficient and in some cases illegal or improper) to continue capturing screen data when no agent is logged in at workstation 200.

Once SCS 140 sends a stop signal to SCCA 211 in step 710, SCCA 211 in turn sends a stop signal to screen capture module 220 in step 711. This second stop signal in a chain may also be triggered directly if SCCA 211 in step 712 detects heartbeat failure (this occurs when SCCA 211 detects loss of heartbeat with SCS 140; note that in many cases when in step 701 SCS 140 detects loss of heartbeat with SCCA 211, its stop signal may not be received by SCCA 211, particularly if there is a loss of network connectivity between SCS 140 and SCCA 211).

When screen capture module 220 receives a stop signal from SCCS 211, it stops capturing screen graphics data in step 720. This action may also be triggered by detection, in step 721, of the fact that the agent's browser 210 has been closed (this is usually desirable since, when browser 210 closes, applet 211 is automatically terminated as well, and therefore all control signals to screen capture module are lost). Detection of browser closure may be detected in various ways known in the art. For example, it is often possible to configure operating system 235 to throw events when a particular application terminates, using scripting tools generally provided with operating system 235. In another embodiment, screen capture module 220 may periodically query operating system 235 to check the running state of browser 210, and when that state is found to have changed from "running" to "not there", screen capture module 220 can conclude that browser 210 must have stopped recently. When screen capture module 220 stops screen capture operations, it does not necessarily stop all activities. Generally, it will be desirable to complete processing of any already-captured data stored in a buffer in memory 231 or on disk 230 before closing screen capture module altogether, and accordingly this is done in step 730. In step 731, if upload is not possible (for instance, if connection to media upload server 141 has been lost), remaining chunks are typically archived locally on HDD 230 until a subsequent upload opportunity. Finally, after all data has been uploaded or archived, screen capture module 220 may optionally be stopped and, also optionally, uninstalled and removed from workstation 220. In some embodiments, screen capture module 220 is installed permanently when first uploaded, for instance as a Windows service, and run each time workstation 200 starts up. In these embodiments, screen capture module 220 is always "at the ready", and need not be uploaded, installed, or started in future screen capture operations. In other embodiments, it may be desirable to completely remove screen capture module 220 after each agent login session, so that screen capture module 220 is only present on workstation 200 when it is operating under the control of SCCA 211, which itself is dependent on browser 210 (which contains it) and under the control of SCS 140.

Figure 8:
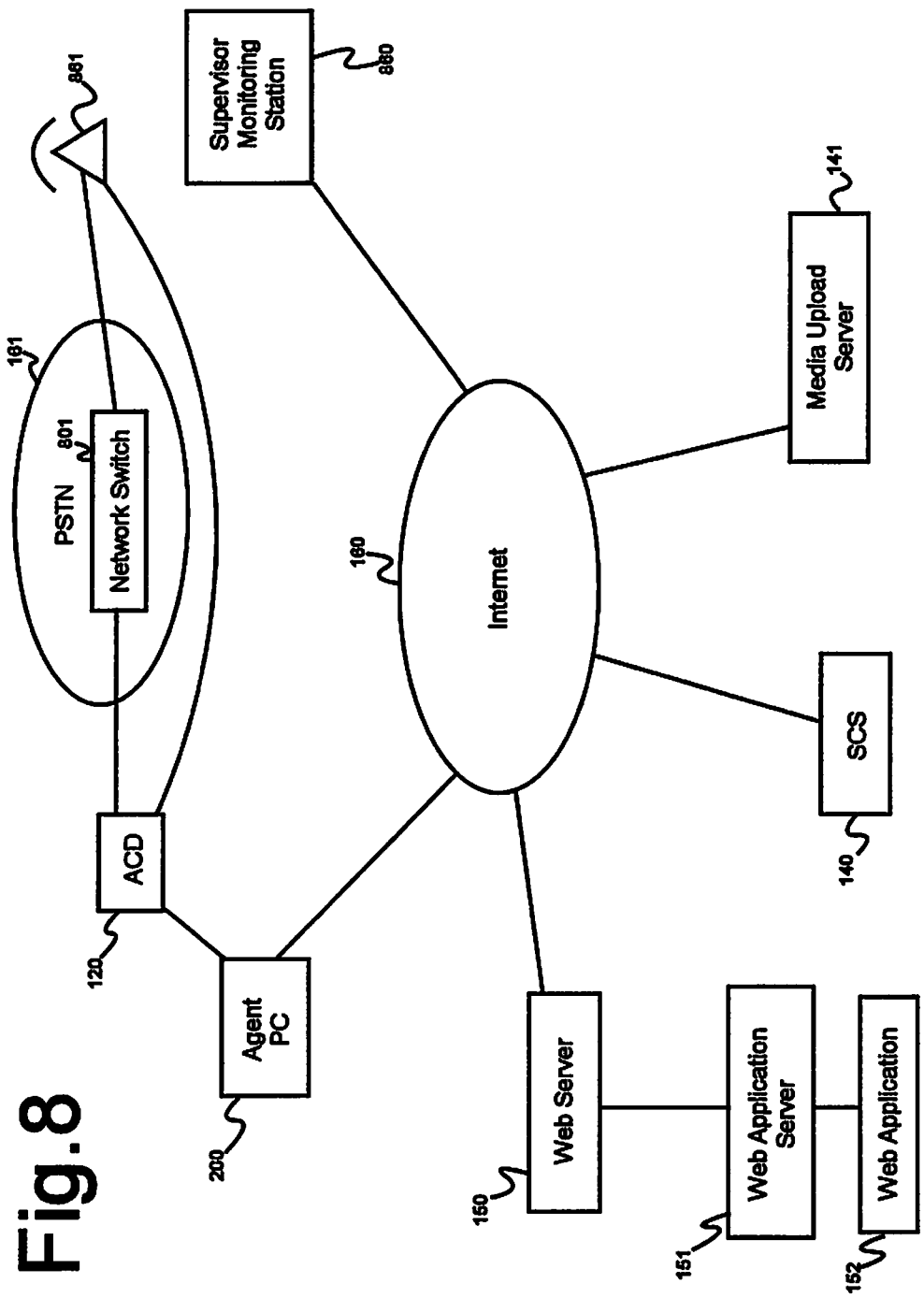
FIG. 8 is a block diagram showing various components and their relationships, according to an embodiment of the invention, enabling real-time monitoring of agent performance including screen monitoring.

In some cases it will be desirable not only to capture screen data for recording and storage in media storage database 142 but also for supporting real-time monitoring of agent interactions with customers. For example, and referring to FIG. 8, in an embodiment a supervisor at supervisor monitoring station 860 may elect to monitor an ongoing call or other interaction between an agent and a customer. Typically ACD 120 provides a capability for a supervisor to silently monitor a call using phone 861 (which is usually connected directly to ACD 120, but need not be; it could be connected via a network-resident switch 801 located in PSTN 161). Supervisor monitoring workstation is connected via Internet or intranet (or other corporate data network) 160 to web server 150, which provides application via web application server 151 to web applications 152, including particularly a supervisor version of an agent's web application (it is common in the art for supervisors and agents to use web-based applications to do all of their work, and for the two applications to be essentially the same, but with different features activated according to the varying needs of different users and user types). In typical embodiments, supervisor workstation 860 will be configured similarly to agent workstation 200 (although it may not include its own screen capture control application 211 and screen capture module 220—but in some cases it will), and specifically will have a browser 210 which can be used to access web application 152. A typical supervisor or quality monitor web application will provide information about agent performance, calls in queue, and so forth, and may include a tab or other user interface element to allow a supervisor to enter a "monitoring mode". When monitoring an agent's interaction with a customer, a supervisor will generally listen to the audio via telephone 861 (most ACDs, again, support this functionality natively), and will be able to view video of what is happening on the agent's workstation by either downloading screen videos from media upload server 141, which of course would have some amount of latency as video won't be available until it has been uploaded from agent workstation 200; alternatively, and particularly when use of a dedicated corporate network 160 means that bandwidth is plentiful, video may be streamed directly from screen capture module 220 on agent workstation 200 to supervisor workstation 860 for real-time viewing.

Figure 9:
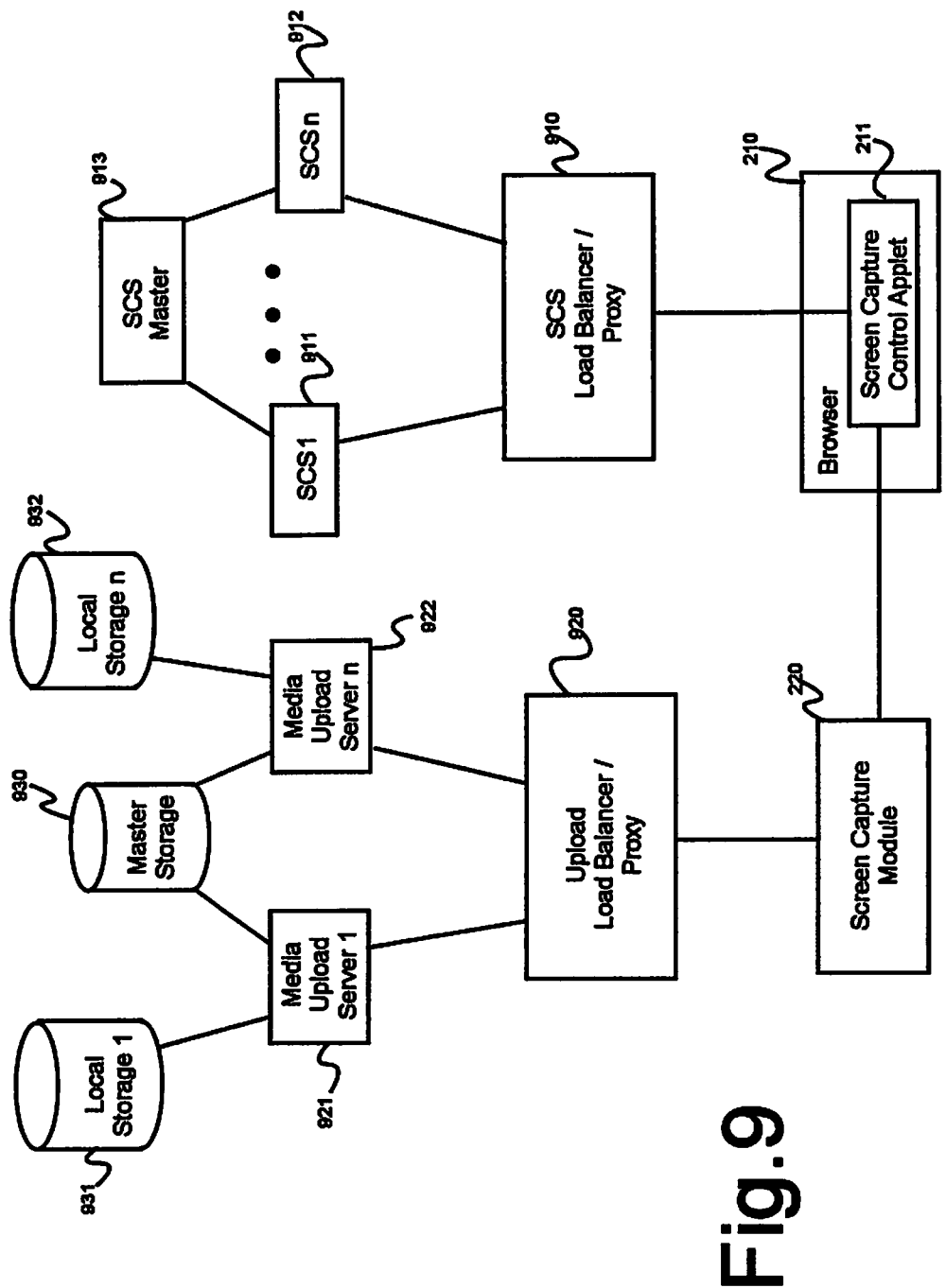
FIG. 9 is a block diagram illustrating various components for implementing load balancing, according to an embodiment of the invention.

In large enterprises, and when robust screen capture capability is desired, it is often desirable to use more than one of each network-based component to provide better scalability and fault tolerance. Accordingly, in a preferred embodiment illustrated in FIG. 9, screen capture module 220 may interact with an upload load balancer of an upload proxy server 920, instead of with a media upload server 141 directly. Similarly, screen capture control applet 211 may connect directly to a screen capture server load balancer or SCS proxy server 910 instead of directly to a screen capture server 140. When screen capture module 220 connects to proxy server 920, it behaves identically to how it behaves in embodiments where it is connected directly to media upload server 141, which of course is one of the primary functions of a proxy server: clients of a proxy server should generally not have to be modified to work with the proxy server. Accordingly, in some embodiments screen capture module 220 maintains a heartbeat mechanism with proxy server 920, and uploads screen graphics video directly to proxy server 920. Proxy server 920 then allocates load among a plurality of media upload servers comprising media upload server 1 921 through media upload server n 922. Generally each customer interaction will be allocated to a specific media upload server 921, 922 by proxy server 920, so that customer interaction data can be stored in one place, although in some embodiments packets of data comprising records 501 or even independent frames 520 are sent by proxy server to any media upload server 921, 922. In such embodiments where customer interactions are uploaded using multiple upload servers 921, 922, in some cases data is reassembled by customer interaction by using an indexing scheme or by allocating different local storage facilities such as local storage 1 931 and local storage n 932. In some embodiments a single master storage 930 is maintained, receiving every packet from every media upload server 921, 922 and carrying out additional functionality to, for instance, eliminate duplicate packets and to order packets and potentially to store them by customer interaction. Similarly, when screen capture control applet 211 connected directly to a proxy server 910 instead of SCS 140, it behaves as if it were connected to SCS 140 including for example maintaining a heartbeat signal, notifying proxy server 910 of changes on agent workstation 200, and receiving control signals from proxy server 910. As is common to proxy servers in general, SCS proxy server 910 does not carry out actual screen capture control functionality, but rather passes notifications and requests between SCCA 211 and one or more screen capture control servers, such as screen capture control server 1 911 and screen capture control server n 912. In some instances, a master screen capture control server 913 may be used, for instance where a single point of communication with a CTI server 121 or an interaction server 125 is desired. Moreover, in some embodiments multiple SCS masters 913 may be employed, each acting as master for a particular set of CTI servers 121 and interaction servers 125; in other embodiments each SCS 911-913 may act both as a master and as a slave, acting as master for certain CTI servers 121 and interaction servers 125, and acting as a slave for all of the rest. In this type of arrangement, when a signal from an SCCA 211 is passed to SCS proxy server 910 and thence on to SCS server n (based on load balancing), and when the signal pertains to a CTI server 121 for which SCS server 1 911 is the master, SCS server n would pass the message to SCS 1 911 for ongoing transmission to the appropriate CTI server 121.

In some embodiments Upload Load Balancer 920 receives requests from screen capture application 220 and, for each request, delivers back an address to screen capture module 220 that corresponds to one of a plurality of media upload servers 921, 922, and screen capture module 220 then connects directly with the designated media upload server 921, 922 to upload screen capture data. In this configuration, server 920 acts merely as a load balancer for a plurality of media upload servers.

The skilled person will be aware of a range of possible modifications of the various embodiments described above. Accordingly, the present invention is defined by the claims and their equivalents.

What is claimed is:

1. A system for zero-footprint screen capture, comprising:
   a communication server software module operating on a network-connected computer;
   a web server software module operating on a network-connected computer;
   a screen capture server software module operating on a network-connected computer; and
   a media upload server software module operating on a network-connected computer;
   wherein the web server, on receiving a request for a specific web page from a client application whose screen is eligible to be captured, uploads a screen capture software application to the client;

further wherein, upon receiving a connection request from the screen capture application uploaded to the client, the screen capture server establishes a connection to the uploaded screen capture application;

further wherein the screen capture server, on receiving a notification from the communication server pertaining to an interaction involving a user of the client application, sends instructions via the connection to the uploaded screen capture application; and wherein the media upload server, on receiving a connection request from the uploaded screen capture application, establishes a connection to the uploaded screen capture application, and receives via the established connection to the uploaded screen capture application one or more data packets containing screen capture graphics data.

2. The system of claim 1, wherein the data packets containing screen capture graphics data are stored in a media storage database connected to the media upload server.

3. The system of claim 1, wherein the data packets containing screen capture graphics data are transmitted by the media upload server to a monitoring station for viewing by a monitoring user.

4. The system of claim 1, wherein the user of the client application eligible for screen capture is an agent of a contact center.

5. The system of claim 1, wherein the data packets are formatted using a protocol that allows at least variable screen capture graphics data compression based on available upload bandwidth.

6. The system of claim 1, comprising a plurality of media upload servers and wherein the screen capture server, when sending instructions to the screen capture application to commence a screen capture operation, includes in the instructions an identity or a location of a particular media upload server to connect to for the screen capture operation being commenced.

7. A method for zero-footprint screen capture, the method comprising the steps of:

(a) establishing a connection from a client device to a web server;
(b) uploading and installing a screen capture application from a screen capture server to the client device, if a screen capture application is not already installed on the client device;
(c) establishing a connection from the uploaded screen capture application to the screen capture server;
(d) receiving a notification from a communication server at the screen capture server pertaining to a user interaction involving the client device;
(e) based at least on notification received, sending instructions from the screen capture server to the uploaded screen capture application instructing it to commence screen capture operations;
(f) based on the instructions received by the uploaded screen capture application, obtaining screen capture screen graphics data; and
(g) sending the screen capture graphics data in a plurality of data packets to a media upload server.

8. The method of claim 7, further comprising the step of storing the screen capture graphics data received by the media upload server in a media storage database.

9. The method of claim 7, further comprising the step of transmitting the data packets containing screen capture graphics data by the media upload server to a monitoring station for viewing by a monitoring user.

10. The method of claim 7, wherein the data packets are formatted using a protocol that allows at least variable screen capture graphics data compression based on available upload bandwidth.

11. The method of claim 7, comprising a plurality of media upload servers and wherein the screen capture server, when sending instructions to the screen capture application to commence a screen capture operation, includes in the instructions an identity or a location of a particular media upload server to connect to for the screen capture operation being commenced.

\* \* \* \* \*